(12) United States Patent
Smith et al.

(10) Patent No.: US 8,897,378 B2
(45) Date of Patent: Nov. 25, 2014

(54) SELECTIVE PERCEPTUAL MASKING VIA SCALE SEPARATION IN THE SPATIAL AND TEMPORAL DOMAINS USING INTRINSIC IMAGES FOR USE IN DATA COMPRESSION

(71) Applicant: Tandent Vision Science, Inc., San Francisco, CA (US)

(72) Inventors: Casey Arthur Smith, Grand Junction, CO (US); Iain Richardson, Aberdeen (GB); Abharana Ramdas Bhat, Aberdeen (GB)

(73) Assignee: Tandent Vision Science, Inc., San Francisco, CA (US)

( * ) Notice: Subject to any disclaimer, the term of this patent is extended or adjusted under 35 U.S.C. 154(b) by 0 days.

(21) Appl. No.: 14/167,521

(22) Filed: Jan. 29, 2014

(65) Prior Publication Data

US 2014/0270567 A1 Sep. 18, 2014

Related U.S. Application Data

(63) Continuation-in-part of application No. 13/796,372, filed on Mar. 12, 2013.

(51) Int. Cl.
*G06T 5/00* (2006.01)
(52) U.S. Cl.
CPC ..................... *G06T 5/002* (2013.01)
USPC ..................... 375/240.29; 382/264
(58) Field of Classification Search
CPC ..................................................... G06T 5/002
See application file for complete search history.

(56) References Cited

U.S. PATENT DOCUMENTS

| | | | |
|---|---|---|---|
| 4,843,472 A * | 6/1989 | Shinada | 348/625 |
| 7,310,370 B2 | 12/2007 | Faroudja | |
| 7,596,266 B2 | 9/2009 | Maxwell et al. | 382/167 |
| 7,672,530 B2 | 3/2010 | Friedhoff et al. | 382/266 |
| 7,873,219 B2 | 1/2011 | Friedhoff | 382/199 |
| 8,249,342 B1 * | 8/2012 | Friedhoff et al. | 382/167 |
| 8,542,319 B1 | 9/2013 | Faroudja | |
| 2004/0240543 A1 | 12/2004 | Faroudja | |
| 2010/0142825 A1 | 6/2010 | Maxwell et al. | 382/199 |
| 2011/0229029 A1 | 9/2011 | Kass | |

(Continued)

OTHER PUBLICATIONS

"A Database and Evaluation Methodology for Optical Flow," S. Baker, D. Scharstein, J.P. Lewis, S. Roth, M. Black, and R. Szeliski, International Journal of Computer Vision, 92(1):1-31, Mar. 2011.

(Continued)

*Primary Examiner* — Andy Rao
*Assistant Examiner* — Tyler Edwards
(74) *Attorney, Agent, or Firm* — Davidson, Davidson & Kappel, LLC; Felix L. D'Arienzo, Jr.

(57) ABSTRACT

An automated, computerized method for processing a video is provided. The method includes providing a video file depicting a video, in a computer memory; providing a video file depicting a video, in a computer memory; scale separating the video file by applying an edge-preserving blurring filter to generate a detail scale-separated video and a level scale-separated video corresponding to the video; temporally blurring the detail scale-separated video and spatially blurring the level scale-separated video; combining the filtered detailed scale-separated video and the filtered level scale-separated video to provide an output video; and outputting the output video for use in a data compression operation.

20 Claims, 32 Drawing Sheets

(56) References Cited

U.S. PATENT DOCUMENTS

2011/0235720 A1 9/2011 Banterle et al.
2012/0033040 A1 2/2012 Pahalawatta et al.
2012/0114263 A1* 5/2012 Stein et al. .................. 382/260

OTHER PUBLICATIONS

"Feature Based Methods for Structure and Motion Estimation," Philip H.S. Torr and Andrew Zisserman, ICCV Workshop on Vision Algorithms, pp. 278-294, 1999.

"An FFT-based technique for translation, rotation, and scale-invariant image registration", B. S Reddy and B. N. Chatterji, IEEE Transactions on Image Processing 5, No. 8 (1996): 1266-1271.

"Survey on Block Matching Motion Estimation Algorithms and Architectures with New Results," Yu-Wen Huang, Ching-Yeh Chen, Chen-Han Tsai, Chun-Fu Shen, Liang-Gee Chen, Journal of VLSI signal processing systems for signal, image and video technology, Mar. 2006, vol. 42, Issue 3, pp. 297-320.

Jack Tumblin et al.: "Two methods for display of high contrast images," ACM Trans. on Graphics 18, 1, pp. 56-94.

Tuan Q. Pham et al. "Seperable bilateral filtering for fast video preprocessing,", International Conference on Multimedia and Expo, IEEE, 2005.

Frédo Durand et al. "Fast Bilateral Filtering for the Display of High-Dynamic-Range Images," ACM Transactions of Graphics (Proceedings of the ACM SIGGRAPH '02 Conference).

K. He, J. Sun et al."Guided Image Filtering,", Proceeding of European Conference Computer Vision (ECCV) (2010).

* cited by examiner

Figure 2: Pixel Array for Storing Image Data

| P(1, 1) | P(1, 2) | ... | P(1, M) |
| P(2, 1) | P(2, 2) | | |
| P(3, 1) | P(3, 2) | | |
| . | | | |
| . | | | |
| . | | | |
| P(N, 1) | ... | | P(N, M) |

Image File 18

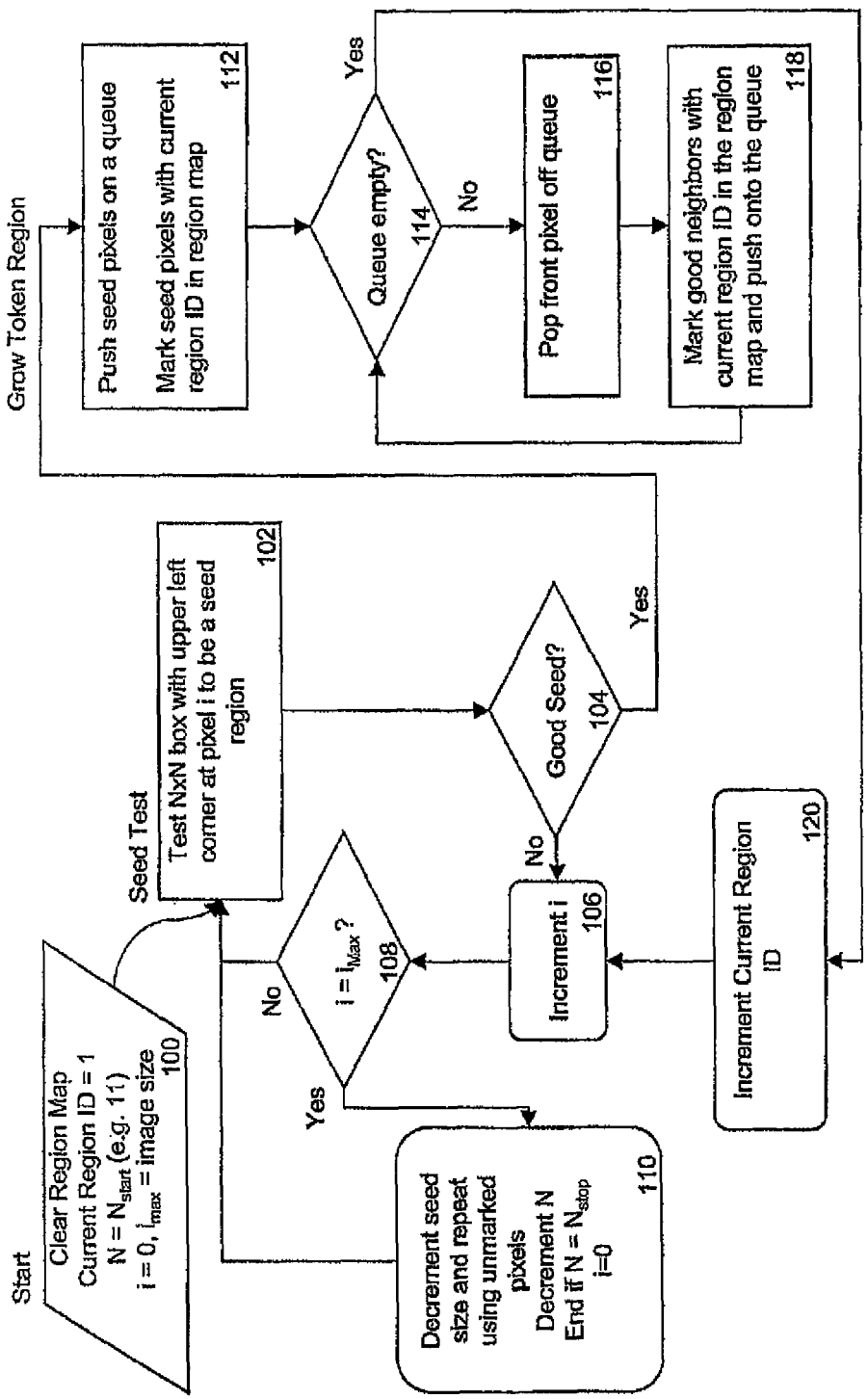
Figure 3A: Identifying Token Regions in an Image

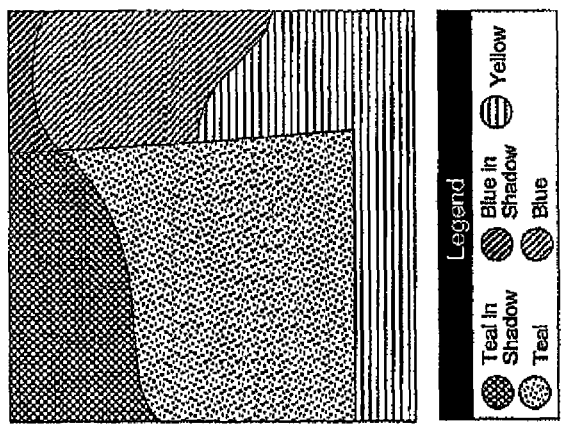
Figure 3B: Original Image
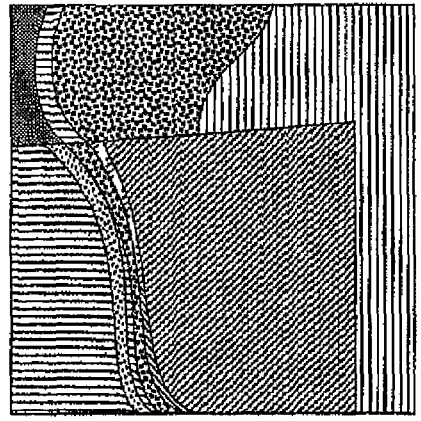
Figure 3C: Token Regions
Figure 3B, 3C: Examples of Identifying Token Regions in an Image

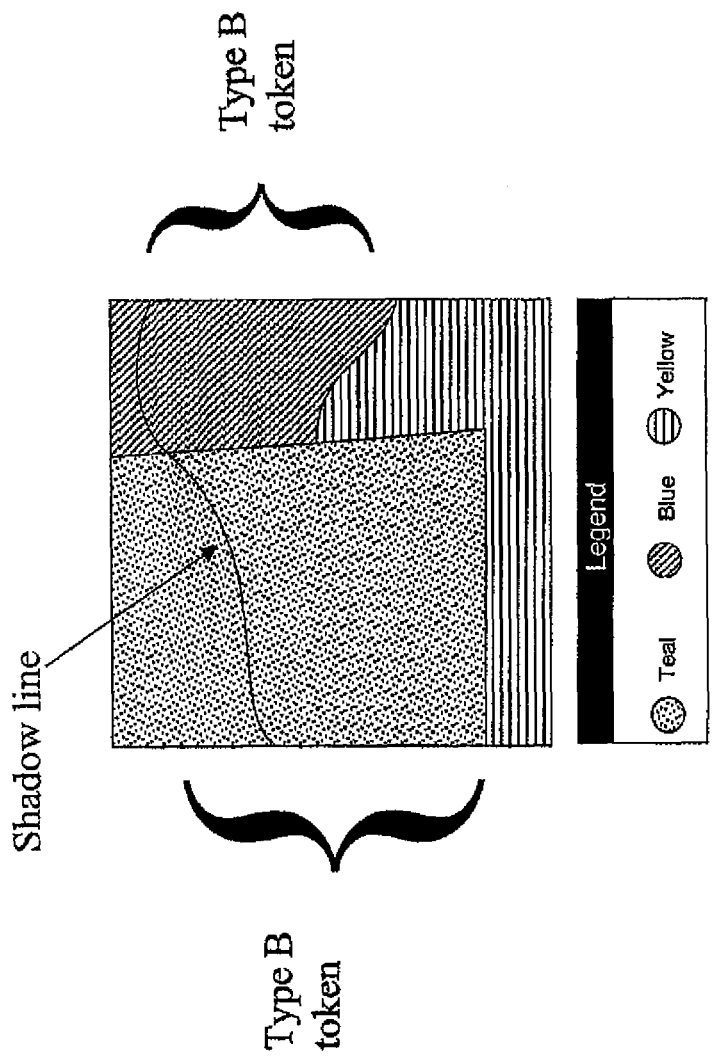
Figure 3D: Type B Tokens

Figure 5: Log Color Space Chromaticity Plane

Figure 6: Selecting colors from an image

Figure 8: Determining log chromaticity coordinates

Figure 9: Optionally augmenting log chromaticity coordinates

Figure 10: Clustering log chromaticity coordinates

Figure 11: Assigning coordinates to clusters

Figure 12: Detecting regions of uniform reflectance based on log chromaticity clustering $$\begin{bmatrix} 1 & -1 & 0 \\ 1 & 0 & -1 \\ 0 & 1 & -1 \end{bmatrix} \begin{bmatrix} I_a \\ I_b \\ I_c \end{bmatrix} = \begin{bmatrix} i_a - i_b \\ i_a - i_c \\ i_b - i_c \end{bmatrix}$$

[A]     [x]  =  [b]

SELECTIVE PERCEPTUAL MASKING VIA SCALE SEPARATION IN THE SPATIAL AND TEMPORAL DOMAINS USING INTRINSIC IMAGES FOR USE IN DATA COMPRESSION

This application is a continuation-in-part application of U.S. application Ser. No. 13/796,372, filed Mar. 12, 2013, which is hereby incorporated by reference herein.

BACKGROUND OF THE INVENTION

Many significant and commercially important uses of modern computer technology relate to images and videos. These include image and video processing, image and video analysis and computer vision applications. In computer vision applications, such as, for example, object recognition and optical character recognition, it has been found that a separation of illumination and material aspects of an image can significantly improve the accuracy and speed of computer performance. Significant pioneer inventions related to the illumination and material aspects of an image are disclosed in U.S. Pat. No. 7,873,219 to Richard Mark Friedhoff, entitled Differentiation Of Illumination And Reflection Boundaries and U.S. Pat. No. 7,672,530 to Richard Mark Friedhoff et al., entitled Method And System For Identifying Illumination Flux In An Image (hereinafter the Friedhoff patents).

SUMMARY OF THE INVENTION

In an exemplary embodiment of the present invention, an automated, computerized method for processing a video is provided. The method includes providing a video file depicting a video, in a computer memory; providing a video file depicting a video, in a computer memory; scale separating the video file by applying an edge preserving blurring filter to generate a detail scale separated video and a level scale separated video corresponding to the video; temporally blurring the detail scale separated video and spatially blurring the level scale separated video; combining the filtered detailed scale separated video and the filtered level scale separated video to provide an output video; and outputting the output video for use in a data compression operation.

In accordance with yet further embodiments of the present invention, computer systems are provided, which include one or more computers configured (e.g., programmed) to perform the methods described above. In accordance with other embodiments of the present invention, non-transitory computer readable media are provided which have stored thereon computer executable process steps operable to control a computer(s) to implement the embodiments described above. The present invention contemplates a computer readable media as any product that embodies information usable in a computer to execute the methods of the present invention, including instructions implemented as a hardware circuit, for example, as in an integrated circuit chip. The automated, computerized methods can be performed by a digital computer, analog computer, optical sensor, state machine, sequencer, integrated chip or any device or apparatus that can be designed or programmed to carry out the steps of the methods of the present invention.

BRIEF DESCRIPTION OF THE DRAWINGS

FIG. 2 shows an n×m pixel array image file for a frame of a video stored in the computer system of FIG. 1.

FIG. 3a is a flow chart for identifying Type C token regions in the image file of FIG. 2, according to a feature of the present invention.

FIG. 3b is an original image used as an example in the identification of Type C tokens.

FIG. 3c shows Type C token regions in the image of FIG. 3b.

FIG. 3d shows Type B tokens, generated from the Type C tokens of FIG. 3c, according to a feature of the present invention.

DETAILED DESCRIPTION OF THE PREFERRED EMBODIMENTS

Figure 1:
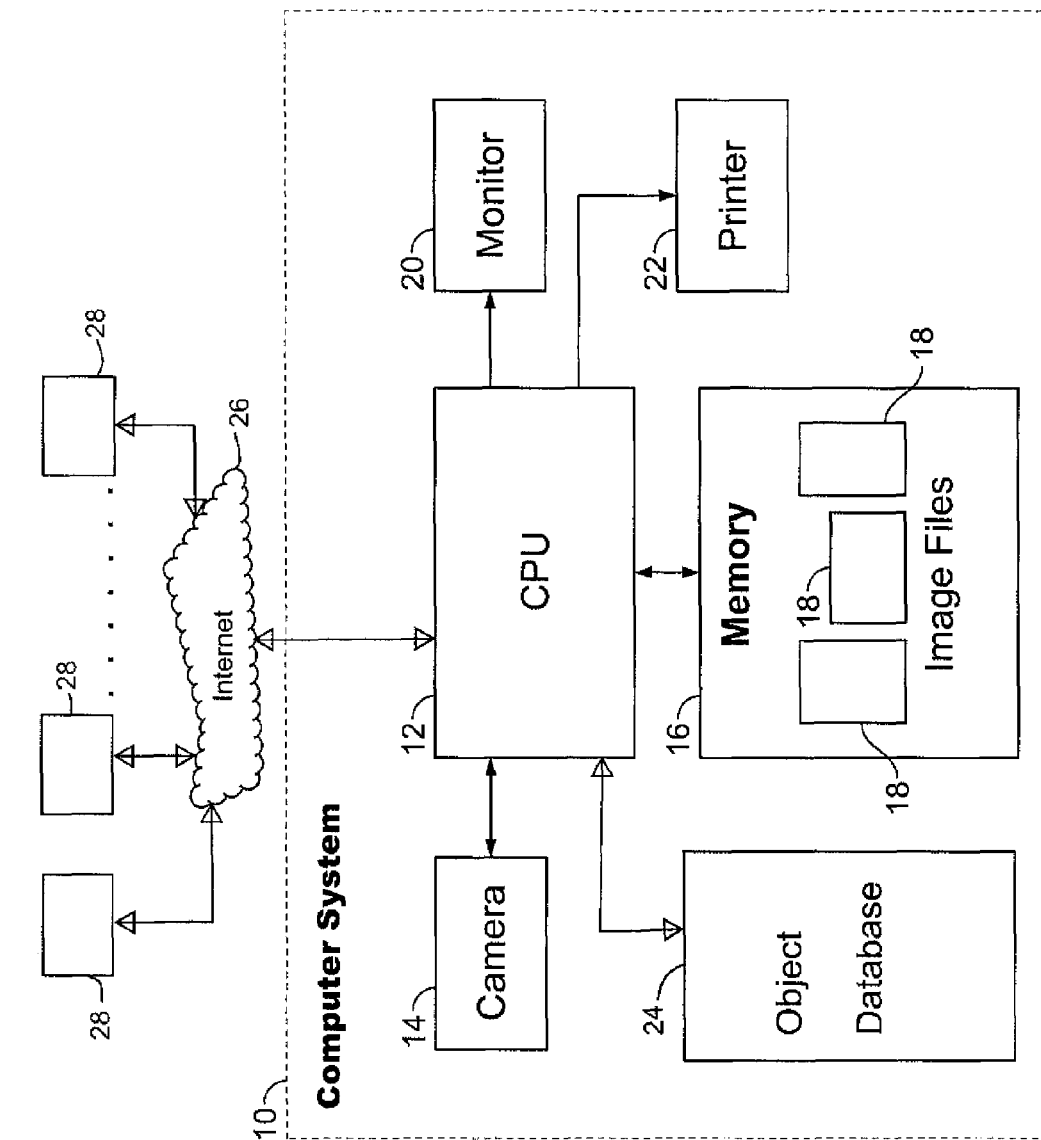
FIG. 1 is a block diagram of a computer system arranged and configured to perform operations related to videos.

Referring now to the drawings, and initially to FIG. 1, there is shown a block diagram of a computer system 10 arranged and configured to perform operations related to videos. A CPU 12 is coupled to a device such as, for example, a digital camera 14 via, for example, a USB port. The digital camera can comprise a video digital camera. The digital camera 14 operates to download videos stored locally on the camera 14, to the CPU 12. The CPU 12 stores the downloaded videos in a memory 16 as video files 18. The video files 18 can be accessed by the CPU 12 for display on a monitor 20. The memory 16 can comprise any temporary or permanent data storage device.

Moreover, the computer system 10 includes an object database 24 storing information on various objects that can appear in the video files 18 stored in the memory 16. The information includes information on the material make-up and material reflectance colors for each object stored in the database 24. The object database is coupled to the CPU 12, as shown in FIG. 1. The CPU 12 is also coupled to the Internet 26, for access to websites 28. The websites 28 include websites that contain information relevant to objects that can appear in the video files 18, such as, for example, the material make-up and material reflectance colors for the objects, and provide another source for an object database. The websites 28 also include websites that are arranged to receive video file 18, transmitted over the Internet 26, from the CPU 12.

Alternatively, the CPU 12 can be implemented as a microprocessor embedded in a device such as, for example, the digital camera 14 or a robot. The CPU 12 can also be equipped with a real time operating system for real time operations related to videos, in connection with, for example, a robotic operation or an interactive operation with a user.

As shown in FIG. 2, each video file 18 comprises a plurality of successive images, called frames, each comprising an n×m pixel array. Each pixel, p, is a picture element corresponding to a discrete portion of the overall image. All of the pixels together define each frame represented by the video file 18. Each pixel comprises a digital value corresponding to a set of color bands, for example, red, green and blue color components (RGB) of the picture element. The present invention is applicable to any multi-band image, where each band corresponds to a piece of the electro-magnetic spectrum. The pixel array includes n rows of m columns each, starting with the pixel p (1,1) and ending with the pixel p(n, m). When displaying a video, the CPU 12 retrieves the corresponding video file 18 from the memory 16, and operates the monitor 20 as a function of the digital values of the pixels in the frames of the video file 18, as is generally known.

In an image operation, the CPU 12 operates to analyze the RGB values of the pixels of images of stored video file 18 to achieve various objectives, such as, for example, to identify regions of an image that correspond to a single material depicted in a scene recorded in the video file 18. A fundamental observation underlying a basic discovery of the present invention, is that an image comprises two components, material and illumination. All changes in an image are caused by one or the other of these components. A method for detecting of one of these components, for example, material, provides a mechanism for distinguishing material or object geometry, such as object edges, from illumination and shadow boundaries.

Such a mechanism enables techniques that can be used to generate intrinsic images. Each of the intrinsic images corresponds to an original image, i.e., video frame, for example, an image depicted in an input video file 18. The intrinsic images include, for example, an illumination image, to capture the intensity and color of light incident upon each point on the surfaces depicted in the image, and a material reflectance image, to capture reflectance properties of surfaces depicted in the image (the percentage of each wavelength of light a surface reflects). The separation of illumination from material in the intrinsic images provides the CPU 12 with images optimized for more effective and accurate and efficient further processing.

For example, according to a feature of the present invention, the intrinsic images are applied in a digital image signal compression algorithm, for improved results in data transmission and/or storage. Computer files that depict an image, particularly a color image, require a significant amount of information arranged as, for example, pixels represented by bytes. Thus, each video file requires a significant amount of storage space in a memory, and can consume a large amount of time in a data transmission of the image to a remote site or device. The amount of time that can be required to transmit a sequence of images, for example, as in a video stream, can render an operation, such as a streaming operation for real-time display of a video on a smartphone, Internet website or tablet, unfeasible.

Accordingly, mathematical techniques have been developed to compress the number of bytes representing the pixels of an image to a significantly smaller number of bytes. For example, standards for lossy video compression developed by organizations such as ISO MPEG, the Moving Picture Experts Group, enable compression of digital video files. A compressed video can be stored in a manner that requires much less storage capacity than the original video file, and transmitted to a remote site or device in a far more efficient and speedy transmission operation. The compressed video file is decompressed for further use, such as, for example, display on a screen. However, due to the rapidly increasing number of users of devices for reception and realtime display of digital videos, known compression techniques are being pressed to the limits of effective functionality.

According to a feature of the present invention, digital signal compression and decompression processing is improved by performing the compression and decompression processes on intrinsic images.

Pursuant to a feature of the present invention, processing is performed at a token level. A token is a connected region of an image wherein the pixels of the region are related to one another in a manner relevant to identification of image features and characteristics such as an identification of materials and illumination. The pixels of a token can be related in terms of either homogeneous factors, such as, for example, close correlation of color among the pixels, or inhomogeneous factors, such as, for example, differing color values related geometrically in a color space such as RGB space, commonly referred to as a texture. The present invention utilizes spatio-spectral information relevant to contiguous pixels of images depicted in a video file 18 to identify token regions. The spatio-spectral information includes spectral relationships among contiguous pixels, in terms of color bands, for example the RGB values of the pixels, and the spatial extent of the pixel spectral characteristics relevant to a single material.

According to one exemplary embodiment of the present invention, tokens are each classified as either a Type A token, a Type B token or a Type C token. A Type A token is a connected image region comprising contiguous pixels that represent the largest possible region of the image encompassing a single material in the scene (uniform reflectance). A Type B token is a connected image region comprising contiguous pixels that represent a region of the image encompassing a single material in the scene, though not necessarily the maximal region of uniform reflectance corresponding to that material. A Type B token can also be defined as a collection of one or more image regions or pixels, all of which have the same reflectance (material color) though not necessarily all pixels which correspond to that material color. A Type C token comprises a connected image region of similar image properties among the contiguous pixels of the token, where similarity is defined with respect to a noise model for the imaging system used to record the image.

Referring now to FIG. 3a, there is shown a flow chart for identifying Type C token regions in the scene depicted in an image of video file 18 of FIG. 2, according to a feature of the present invention. Type C tokens can be readily identified in an image, utilizing the steps of FIG. 3a, and then analyzed and processed to construct Type B tokens, according to a feature of the present invention.

A $1^{st}$ order uniform, homogeneous Type C token comprises a single robust color measurement among contiguous pixels of the image. At the start of the identification routine, the CPU 12 sets up a region map in memory. In step 100, the CPU 12 clears the region map and assigns a region ID, which is initially set at 1. An iteration for the routine, corresponding to a pixel number, is set at i=0, and a number for an N×N pixel array, for use as a seed to determine the token, is set an initial value, $N=N_{start}$. $N_{start}$ can be any integer>0, for example it can be set at set at 11 or 15 pixels.

At step 102, a seed test is begun. The CPU 12 selects a first pixel, i=1, pixel (1, 1) for example (see FIG. 2), the pixel at the upper left corner of a first N×N sample of an image of video file 18. The pixel is then tested in decision block 104 to determine if the selected pixel is part of a good seed. The test can comprise a comparison of the color value of the selected pixel to the color values of a preselected number of its neighboring pixels as the seed, for example, the N×N array. The color values comparison can be with respect to multiple color band values (RGB in our example) of the pixel. If the comparison does not result in approximately equal values (within the noise levels of the recording device) for the pixels in the seed, the CPU 12 increments the value of i (step 106), for example, i=2, pixel (1, 2), for a next N×N seed sample, and then tests to determine if $i=i_{max}$ (decision block 108).

If the pixel value is at $i_{max}$, a value selected as a threshold for deciding to reduce the seed size for improved results, the seed size, N, is reduced (step 110), for example, from N=15 to N=12. In an exemplary embodiment of the present invention, $i_{max}$ can be set at a number of pixels in an image ending at pixel (n, m), as shown in FIG. 2. In this manner, the routine of FIG. 3a parses the entire image at a first value of N before repeating the routine for a reduced value of N.

After reduction of the seed size, the routine returns to step 102, and continues to test for token seeds. An $N_{stop}$ value (for example, N=2) is also checked in step 110 to determine if the analysis is complete. If the value of N is at $N_{stop}$, the CPU 12 has completed a survey of the image pixel arrays and exits the routine.

If the value of i is less than $i_{max}$, and N is greater than $N_{stop}$, the routine returns to step 102, and continues to test for token seeds.

When a good seed (an N×N array with approximately equal pixel values) is found (block 104), the token is grown from the seed. In step 112, the CPU 12 pushes the pixels from the seed onto a queue. All of the pixels in the queue are marked with the current region ID in the region map. The CPU 12 then inquires as to whether the queue is empty (decision block 114). If the queue is not empty, the routine proceeds to step 116.

In step 116, the CPU 12 pops the front pixel off the queue and proceeds to step 118. In step 118, the CPU 12 marks "good" neighbors around the subject pixel, that is neighbors approximately equal in color value to the subject pixel, with the current region ID. All of the marked good neighbors are placed in the region map and also pushed onto the queue. The CPU 12 then returns to the decision block 114. The routine of steps 114, 116, 118 is repeated until the queue is empty. At that time, all of the pixels forming a token in the current region will have been identified and marked in the region map as a Type C token.

When the queue is empty, the CPU 12 proceeds to step 120. At step 120, the CPU 12 increments the region ID for use with identification of a next token. The CPU 12 then returns to step 106 to repeat the routine in respect of the new current token region.

Upon arrival at $N=N_{stop}$, step 110 of the flow chart of FIG. 3a, or completion of a region map that coincides with the image, the routine will have completed the token building task. FIG. 3b is an original image used as an example in the identification of tokens. The image shows areas of the color blue and the blue in shadow, and of the color teal and the teal in shadow. FIG. 3c shows token regions corresponding to the region map, for example, as identified through execution of the routine of FIG. 3a (Type C tokens), in respect to the image of FIG. 3b. The token regions are color coded to illustrate the token makeup of the image of FIG. 3b, including penumbra regions between the full color blue and teal areas of the image and the shadow of the colored areas.

While each Type C token comprises a region of the image having a single robust color measurement among contiguous pixels of the image, the token may grow across material boundaries. Typically, different materials connect together in one Type C token via a neck region often located on shadow boundaries or in areas with varying illumination crossing different materials with similar hue but different intensities. A neck pixel can be identified by examining characteristics of adjacent pixels. When a pixel has two contiguous pixels on opposite sides that are not within the corresponding token, and two contiguous pixels on opposite sides that are within the corresponding token, the pixel is defined as a neck pixel.

Figure 4:
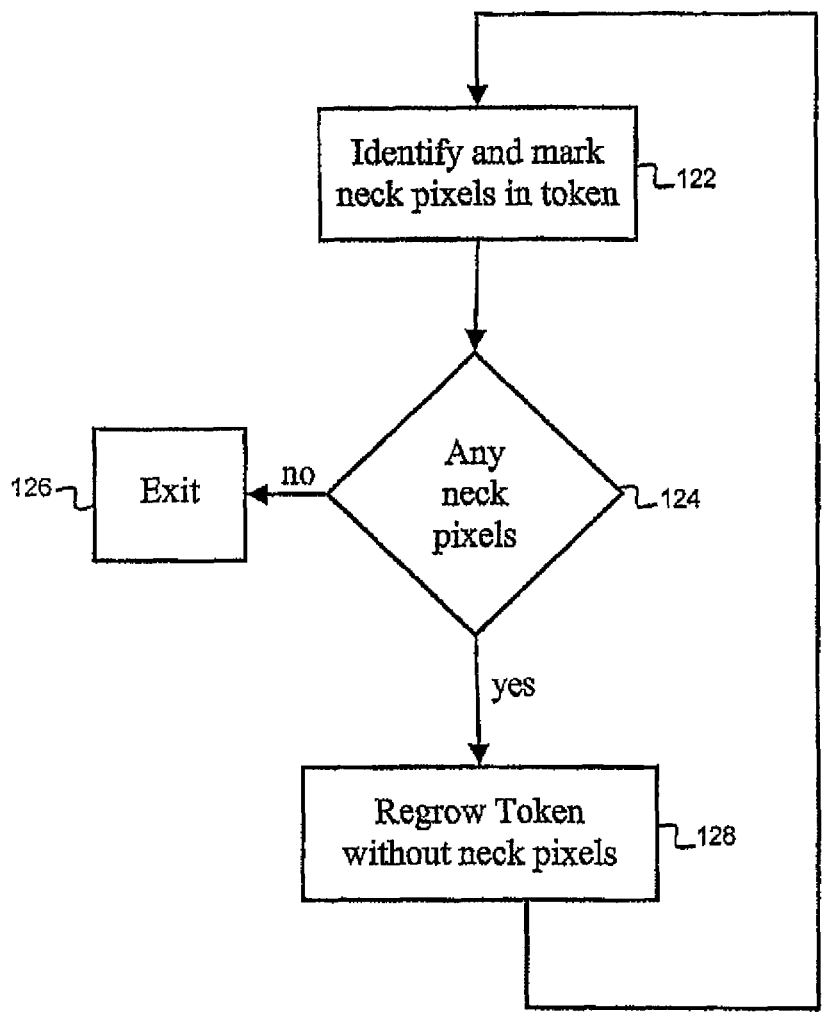
FIG. 4 is a flow chart for a routine to test Type C tokens identified by the routine of the flow chart of FIG. 3a, according to a feature of the present invention.

FIG. 4 shows a flow chart for a neck test for Type C tokens. In step 122, the CPU 12 examines each pixel of an identified token to determine whether any of the pixels under examination forms a neck. The routine of FIG. 4 can be executed as a subroutine directly after a particular token is identified during execution of the routine of FIG. 3a. All pixels identified as a neck are marked as "ungrowable." In decision block 124, the CPU 12 determines if any of the pixels were marked.

If no, the CPU 12 exits the routine of FIG. 4 and returns to the routine of FIG. 3*a* (step 126).

If yes, the CPU 12 proceeds to step 128 and operates to regrow the token from a seed location selected from among the unmarked pixels of the current token, as per the routine of FIG. 3*a*, without changing the counts for seed size and region ID. During the regrowth process, the CPU 12 does not include any pixel previously marked as ungrowable. After the token is regrown, the previously marked pixels are unmarked so that other tokens may grow into them.

Subsequent to the regrowth of the token without the previously marked pixels, the CPU 12 returns to step 122 to test the newly regrown token. Neck testing identifies Type C tokens that cross material boundaries, and regrows the identified tokens to provide single material Type C tokens suitable for use in creating Type B tokens.

FIG. 3*d* shows Type B tokens generated from the Type C tokens of FIG. 3*c*, according to a feature of the present invention. The present invention provides a novel exemplary technique using log chromaticity clustering, for constructing Type B tokens for images of video file 18. Log chromaticity is a technique for developing an illumination invariant chromaticity space.

A method and system for separating illumination and reflectance using a log chromaticity representation is disclosed in U.S. Pat. No. 7,596,266, which is hereby expressly incorporated by reference. The techniques taught in U.S. Pat. No. 7,596,266 can be used to provide illumination invariant log chromaticity representation values for each color of an image, for example, as represented by Type C tokens. Logarithmic values of the color band values of the image pixels are plotted on a log-color space graph. The logarithmic values are then projected to a log-chromaticity projection plane oriented as a function of a bi-illuminant dichromatic reflection model (BIDR model), to provide a log chromaticity value for each pixel, as taught in U.S. Pat. No. 7,596,266. The BIDR Model predicts that differing color measurement values fall within a cylinder in RGB space, from a dark end (in shadow) to a bright end (lit end), along a positive slope, when the color change is due to an illumination change forming a shadow over a single material of a scene depicted in the image.

Figure 5:
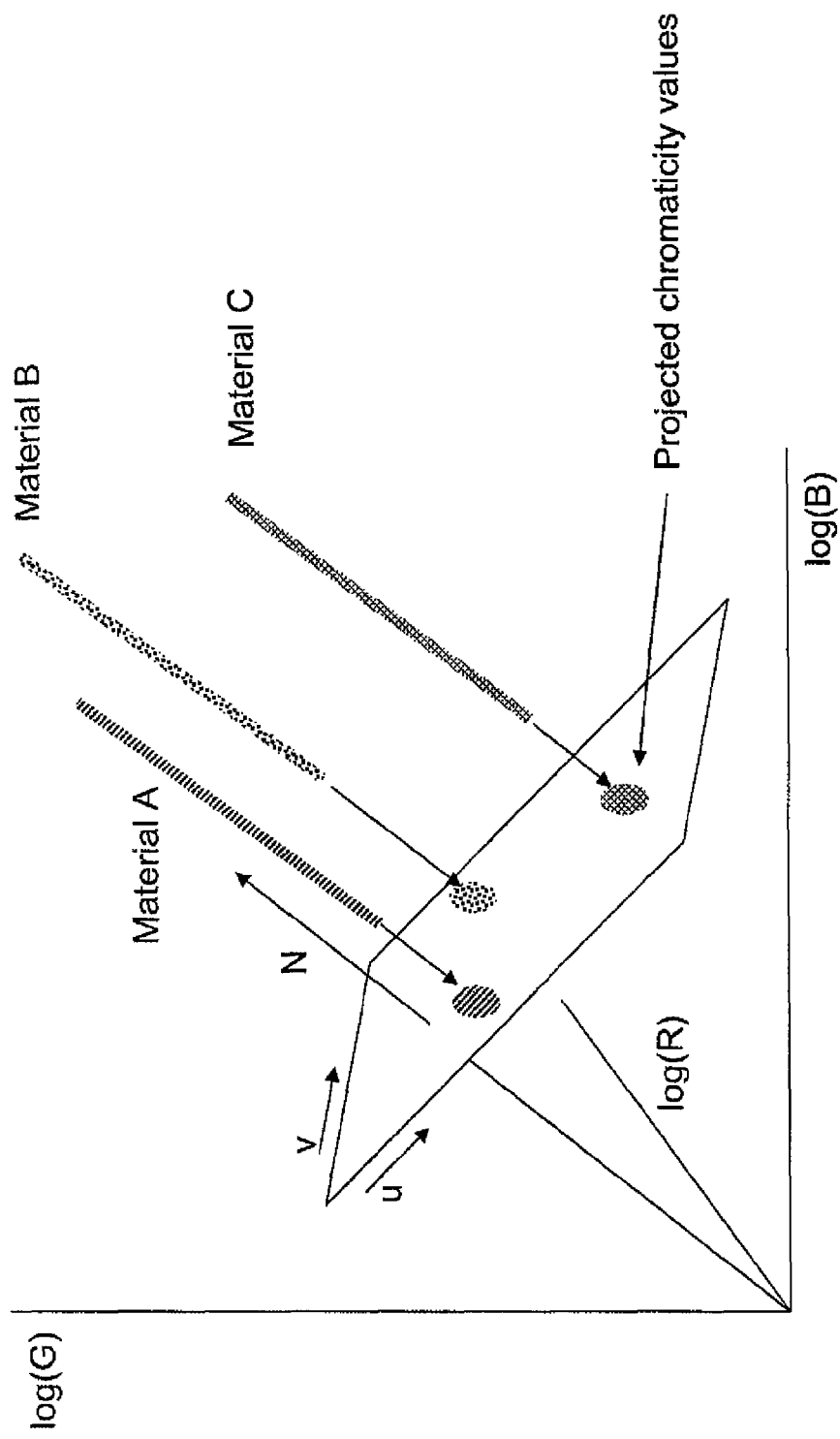
FIG. 5 is a graphic representation of a log color space chromaticity plane according to a feature of the present invention.

FIG. 5 is a graphic representation of a log color space, bi-illuminant chromaticity plane according to a feature of the invention disclosed in U.S. Pat. No. 7,596,266. The alignment of the chromaticity plane is determined by a vector N, normal to the chromaticity plane, and defined as $N=\log(Bright_{vector})-\log(Dark_{vector})=\log(1+1/S_{vector})$. The co-ordinates of the plane, u, v can be defined by a projection of the green axis onto the chromaticity plane as the u axis, and the cross product of u and N being defined as the v axis. In our example, each log value for the materials A, B, C is projected onto the chromaticity plane, and will therefore have a corresponding u, v co-ordinate value in the plane that is a chromaticity value, as shown in FIG. 5.

Thus, according to the technique disclosed in U.S. Pat. No. 7,596,266, the RGB values of each pixel in each image of video file 18 can be mapped by the CPU 12 from the image file value p(n, m, R, G, B) to a log value, then, through a projection to the chromaticity plane, to the corresponding u, v value, as shown in FIG. 5. Each pixel p(n, m, R, G, B) in the corresponding image of video file 18 is then replaced by the CPU 12 by a two dimensional chromaticity value: p(n, m, u, v), to provide a chromaticity representation of the original RGB image. In general, for an N band image, the N color values are replaced by N−1 chromaticity values. The chromaticity representation is a truly accurate illumination invariant representation because the BIDR model upon which the representation is based, accurately and correctly represents the illumination flux that caused the original image.

According to a feature of the present invention, log chromaticity values are calculated for each color depicted in an image of video file 18 input to the CPU 12 for identification of regions of the uniform reflectance (Type B tokens). For example, each pixel of a Type C token will be of approximately the same color value, for example, in terms of RGB values, as all the other constituent pixels of the same Type C token, within the noise level of the equipment used to record the image. Thus, an average of the color values for the constituent pixels of each particular Type C token can be used to represent the color value for the respective Type C token in the log chromaticity analysis.

Figure 6:
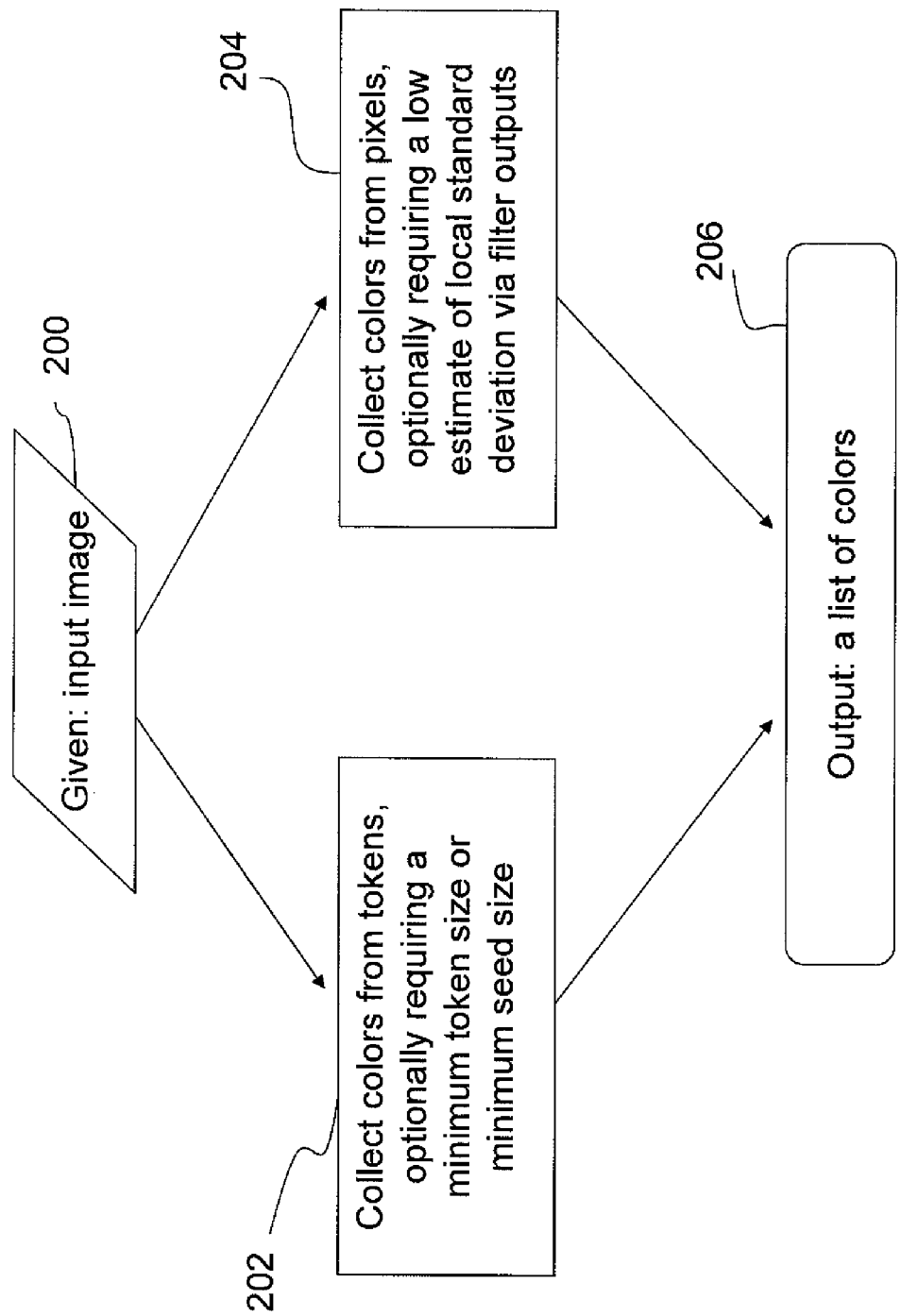
FIG. 6 is a flow chart for determining a list of colors depicted in an input image.

FIG. 6 is a flow chart for determining a list of colors depicted in an input image, for example, an image of video file 18. In step 200, an input video file 18 is input to the CPU 12 for processing. In steps 202 and 204, the CPU 12 determines the colors depicted in the input image of video file 18. In step 202, the CPU 12 calculates an average color for each Type C token determined by the CPU 12 through execution of the routine of FIG. 3*a*, as described above, for a list of colors. The CPU 12 can be operated to optionally require a minimum token size, in terms of the number of constituent pixels of the token, or a minimum seed size (the N×N array) used to determine Type C tokens according to the routine of FIG. 3*a*, for the analysis. The minimum size requirements are implemented to assure that color measurements in the list of colors for the image are an accurate depiction of color in a scene depicted in the input image, and not an artifact of blend pixels.

Blend pixels are pixels between two differently colored regions of an image. If the colors between the two regions are plotted in RGB space, there is a linear transition between the colors, with each blend pixel, moving from one region to the next, being a weighted average of the colors of the two regions. Thus, each blend pixel does not represent a true color of the image. If blend pixels are present, relatively small Type C tokens, consisting of blend pixels, can be identified for areas of an image between two differently colored regions. By requiring a size minimum, the CPU 12 can eliminate tokens consisting of blend pixel from the analysis.

In step 204, the CPU 12 can alternatively collect colors at the pixel level, that is, the RGB values of the pixels of the input image of video file 18, as shown in FIG. 2. The CPU 12 can be operated to optionally require each pixel of the image of video file 18 used in the analysis to have a minimum stability or local standard deviation via a filter output, for a more accurate list of colors. For example, second derivative energy can be used to indicate the stability of pixels of an image.

In this approach, the CPU 12 calculates a second derivative at each pixel, or a subset of pixels disbursed across the image to cover all illumination conditions of the image depicted in an input video file 18, using a Difference of Gaussians, Laplacian of Gaussian, or similar filter. The second derivative energy for each pixel examined can then be calculated by the CPU 12 as the average of the absolute value of the second derivative in each color band (or the absolute value of the single value in a grayscale image), the sum of squares of the values of the second derivatives in each color band (or the square of the single value in a grayscale image), the maximum squared second derivative value across the color bands (or the square of the single value in a grayscale image), or any similar method. Upon the calculation of the second derivative energy for each of the pixels, the CPU 12 analyzes the energy values of the pixels. There is an inverse relationship between second derivative energy and pixel stability, the higher the energy, the less stable the corresponding pixel.

In step 206, the CPU 12 outputs a list or lists of color (after executing one or both of steps 202 and/or 204). According to a feature of the present invention, all of the further processing can be executed using the list from either step 202 or 204, or vary the list used (one or the other of the lists from steps 202 or 204) at each subsequent step.

Figure 7:
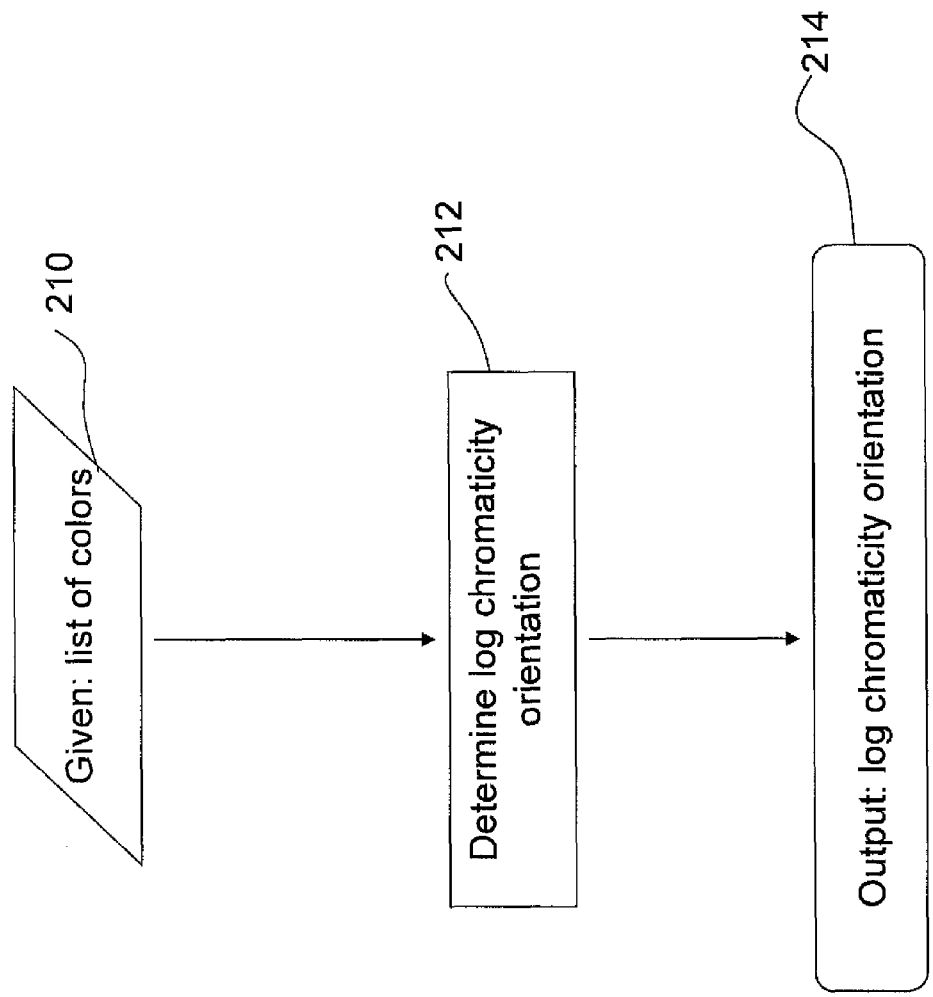
FIG. 7 is a flow chart for determining an orientation for a log chromaticity space, according to a feature of the present invention.

FIG. 7 is a flow chart for determining an orientation for a log chromaticity representation, according to a feature of the present invention. For example, the CPU 12 determines an orientation for the normal N, for a log chromaticity plane, as shown in FIG. 5. In step 210, the CPU 12 receives a list of colors for an input file 18, such as a list output in step 206 of the routine of FIG. 6. In step 212, the CPU 12 determines an orientation for a log chromaticity space.

As taught in U.S. Pat. No. 7,596,266, and as noted above, alignment of the chromaticity plane is represented by N, N being a vector normal to the chromaticity representation, for example, the chromaticity plane of FIG. 5. The orientation is estimated by the CPU 12 thorough execution of any one of several techniques. For example, the CPU 12 can determine estimates based upon entropy minimization, manual selection by a user or the use of a characteristic spectral ratio for an image of an input video file 18, as fully disclosed in U.S. Pat. No. 7,596,266.

For a higher dimensional set of colors, for example, an RYGB space (red, yellow, green, blue), the log chromaticity normal, N, defines a sub-space with one less dimension than the input space. Thus, in the four dimensional RYGB space, the normal N defines a three dimensional log chromaticity space. When the four dimensional RYGB values are projected into the three dimensional log chromaticity space, the projected values within the log chromaticity space are unaffected by illumination variation.

In step 214, the CPU 12 outputs an orientation for the normal N. As illustrated in the example of FIG. 5, the normal N defines an orientation for a u, v plane in a three dimensional RGB space.

Figure 8:
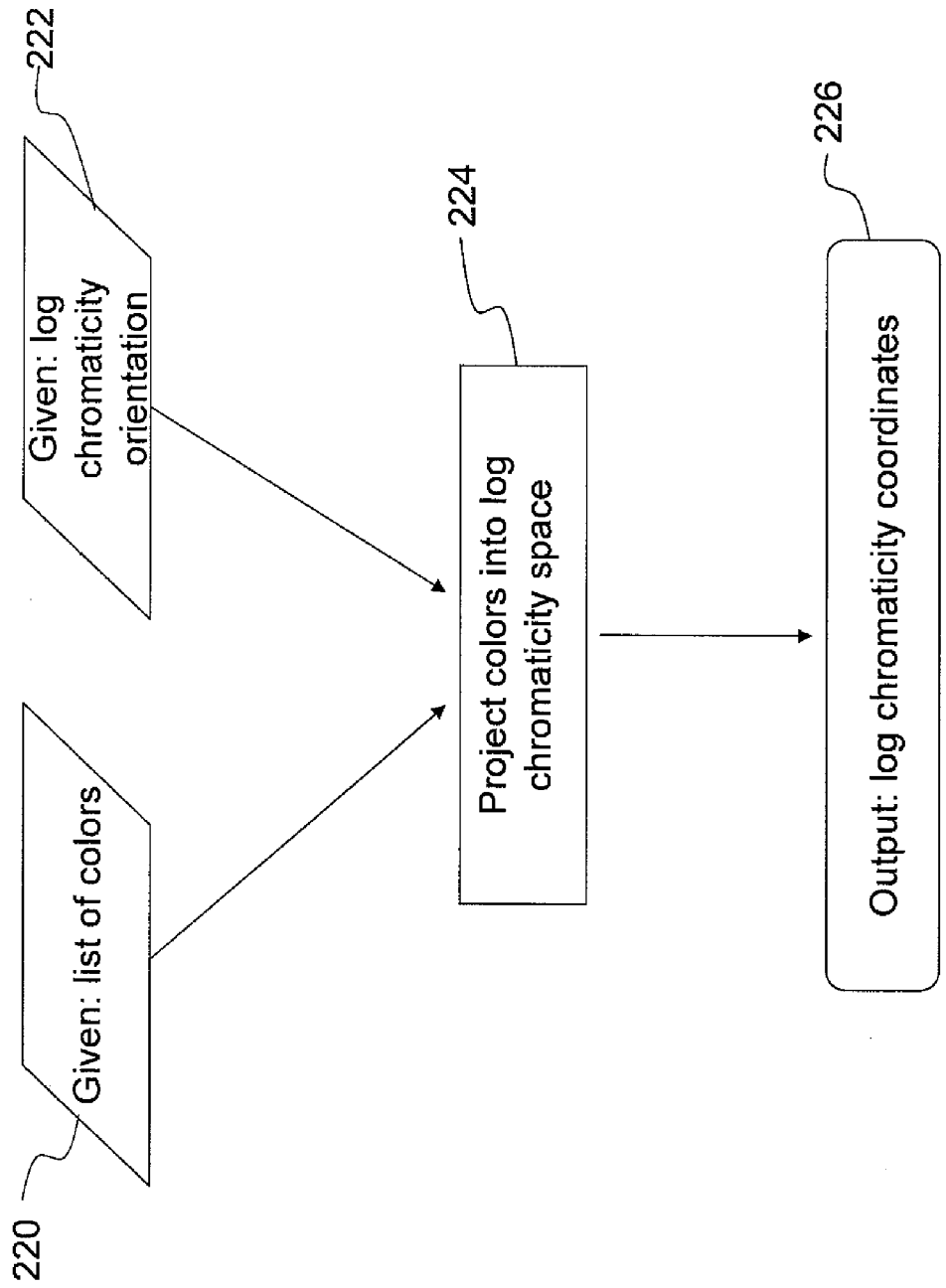
FIG. 8 is a flow chart for determining log chromaticity coordinates for the colors of an input image, as determined through execution of the routine of FIG. 6, according to a feature of the present invention.

FIG. 8 is a flow chart for determining log chromaticity coordinates for the colors of an input image, as identified in steps 202 or 204 of the routine of FIG. 6, according to a feature of the present invention. In step 220, a list of colors is input to the CPU 12. The list of colors can comprise either the list generated through execution of step 202 of the routine of FIG. 6, or the list generated through execution of step 204. In step 222, the log chromaticity orientation for the normal, N, determined through execution of the routine of FIG. 7, is also input to the CPU 12.

In step 224, the CPU 12 operates to calculate a log value for each color in the list of colors and plots the log values in a three dimensional log space at respective (log R, log G, log B) coordinates, as illustrated in FIG. 5. Materials A, B and C denote log values for specific colors from the list of colors input to the CPU 12 in step 220. A log chromaticity plane is also calculated by the CPU 12, in the three dimensional log space, with u, v coordinates and an orientation set by N, input to the CPU 12 in step 222. Each u, v coordinate in the log chromaticity plane can also be designated by a corresponding (log R, log G, log B) coordinate in the three dimensional log space.

According to a feature of the present invention, the CPU 12 then projects the log values for the colors A, B and C onto the log chromaticity plane to determine a u, v log chromaticity coordinate for each color. Each u, v log chromaticity coordinate can be expressed by the corresponding (log R, log G, log B) coordinate in the three dimensional log space. The CPU 12 outputs a list of the log chromaticity coordinates in step 226. The list cross-references each color to a u, v log chromaticity coordinate and to the pixels (or a Type C tokens) having the respective color (depending upon the list of colors used in the analysis (either step 202 (tokens) or 204 (pixels))).

Figure 9:
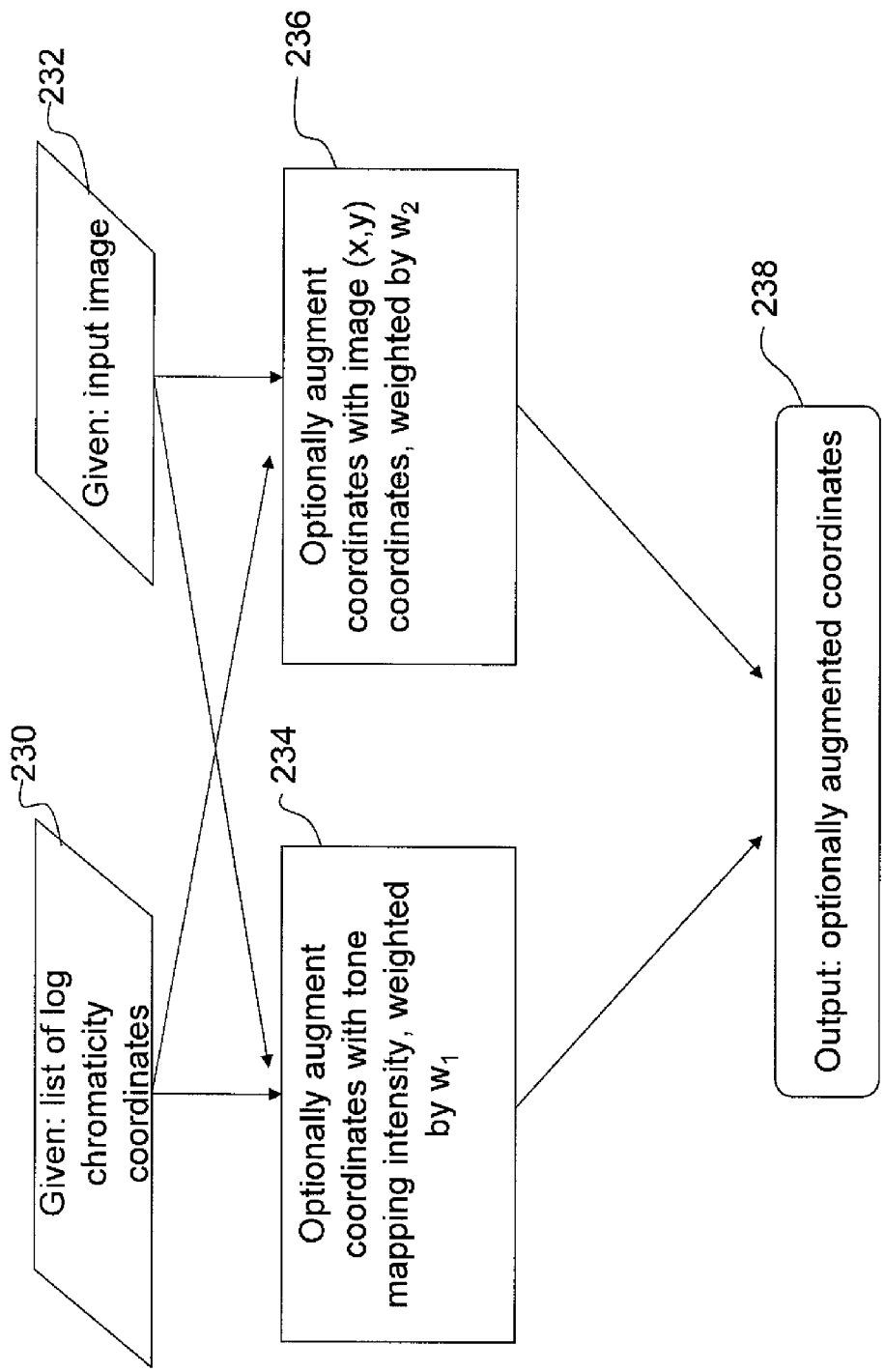
FIG. 9 is a flow chart for augmenting the log chromaticity coordinates, as determined through execution of the routine of FIG. 8, according to a feature of the present invention.

FIG. 9 is a flow chart for optionally augmenting the log chromaticity coordinates for pixels or Type C tokens with extra dimensions, according to a feature of the present invention. In step 230, the list of log chromaticity coordinates, determined for the colors of the input image through execution of the routine of FIG. 8, is input to the CPU 12. In step 232, the CPU 12 accesses the input video file 18, for use in the augmentation.

In step 234, the CPU 12 optionally operates to augment each log chromaticity coordinate with a tone mapping intensity for each corresponding pixel (or Type C token). The tone mapping intensity is determined using any known tone mapping technique. An augmentation with tone mapping intensity information provides a basis for clustering pixels or tokens that are grouped according to both similar log chromaticity coordinates and similar tone mapping intensities. This improves the accuracy of a clustering step.

In step 236, the CPU 12 optionally operates to augment each log chromaticity coordinate with x, y coordinates for the corresponding pixel (or an average of the x, y coordinates for the constituent pixels of a Type C token) (see FIG. 2 showing a P (1,1) to P (N, M) pixel arrangement). Thus, a clustering step with x, y coordinate information will provide groups in a spatially limited arrangement, when that characteristic is desired.

In each of steps 234 and 236, the augmented information can, in each case, be weighted by a factor $w_1$ and $w_2$, $w_3$ respectively, to specify the relative importance and scale of the different dimensions in the augmented coordinates. The weight factors $w_1$ and $w_2$, $w_3$ are user-specified. Accordingly, the (log R, log G, log B) coordinates for a pixel or Type C token is augmented to (log R, log G, log B, $T*w_1$, $x*w_2$, $y*w_3$) where T, x and y are the tone mapped intensity, the x coordinate and the y coordinate, respectively.

In step 238, the CPU 12 outputs a list of the augmented coordinates. The augmented log chromaticity coordinates provide accurate illumination invariant representations of the pixels, or for a specified regional arrangement of an input image, such as, for example, Type C tokens. According to a feature of the present invention, the illumination invariant characteristic of the log chromaticity coordinates is relied upon as a basis to identify regions of an image of a single material or reflectance, such as, for example, Type B tokens.

Figure 10:
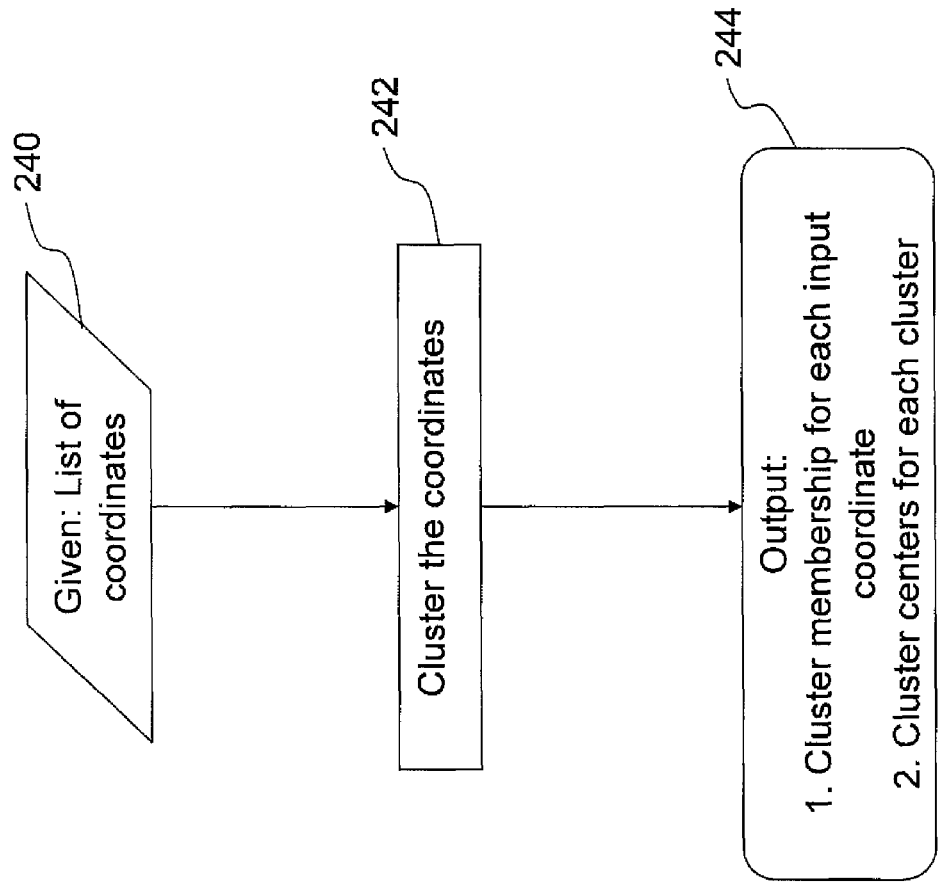
FIG. 10 is a flow chart for clustering the log chromaticity coordinates, according to a feature of the present invention.

FIG. 10 is a flow chart for clustering the log chromaticity coordinates, according to a feature of the present invention. In step 240, the list of augmented log chromaticity coordinates is input the CPU 12. In step 242, the CPU 12 operates to cluster the log chromaticity coordinates. The clustering step can be implemented via, for example, a known k-means clustering. Any known clustering technique can be used to cluster the log chromaticity coordinates to determine groups of similar log chromaticity coordinate values. The CPU 12 correlates each log chromaticity coordinate to the group to which the respective coordinate belongs. The CPU 12 also operates to calculate a center for each group identified in the clustering step. For example, the CPU 12 can determine a center for each group relative to a (log R, log G, log B, log T) space.

In step 244, the CPU 12 outputs a list of the cluster group memberships for the log chromaticity coordinates (cross referenced to either the corresponding pixels or Type C tokens) and/or a list of cluster group centers.

As noted above, in the execution of the clustering method, the CPU 12 can use the list of colors from either the list generated through execution of step 202 of the routine of FIG. 6, or the list generated through execution of step 204. In applying the identified cluster groups to an input image, the CPU 12 can be operated to use the same set of colors as used in the clustering method (one of the list of colors corresponding to step 202 or to the list of colors corresponding to step 204), or apply a different set of colors (the other of the list of colors corresponding to step 202 or the list of colors corresponding to step 204). If a different set of colors is used, the CPU 12 proceeds to execute the routine of FIG. 11.

Figure 11:
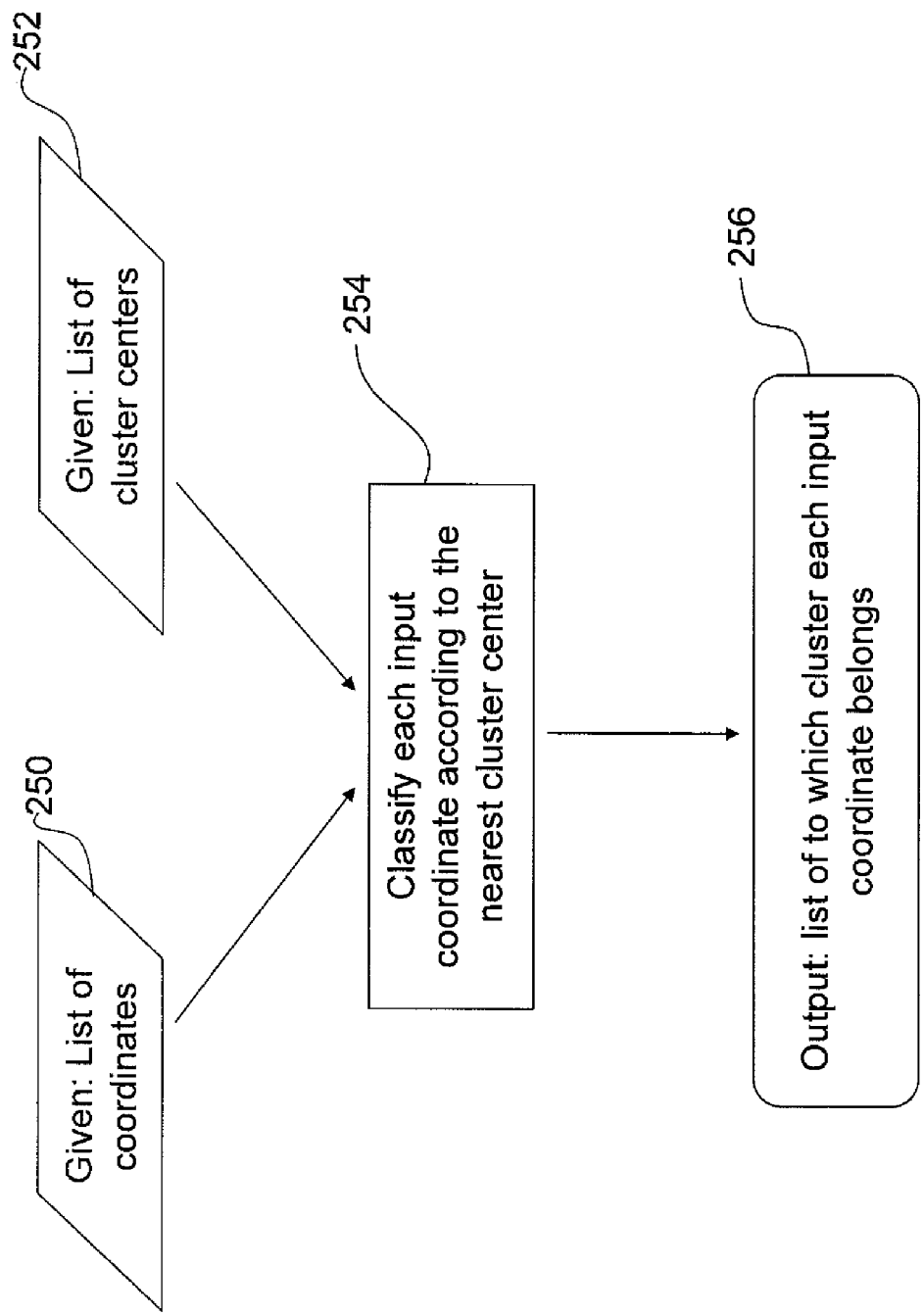
FIG. 11 is a flow chart for assigning the log chromaticity coordinates to clusters determined through execution of the routine of FIG. 10, according to a feature of the present invention.

FIG. 11 is a flow chart for assigning the log chromaticity coordinates to clusters determined through execution of the routine of FIG. 10, when a different list of colors is used after the identification of the cluster groups, according to a feature of the present invention. In step 250, the CPU 12 once again executes the routine of FIG. 8, this time in respect to the new list of colors. For example, if the list of colors generated in step 202 (colors based upon Type C tokens) was used to identify the cluster groups, and the CPU 12 then operates to classify log chromaticity coordinates relative to cluster groups based upon the list of colors generated in step 204 (colors based upon pixels), step 250 of the routine of FIG. 11 is executed to determine the log chromaticity coordinates for the colors of the pixels in the corresponding image of the input video file 18.

In step 252, the list of cluster centers is input to the CPU 12. In step 254, the CPU 12 operates to classify each of the log chromaticity coordinates identified in step 250, according to the nearest cluster group center. In step 256, the CPU 12 outputs a list of the cluster group memberships for the log chromaticity coordinates based upon the new list of colors, with a cross reference to either corresponding pixels or Type C tokens, depending upon the list of colors used in step 250 (the list of colors generated in step 202 or the list of colors generated in step 204).

Figure 12:
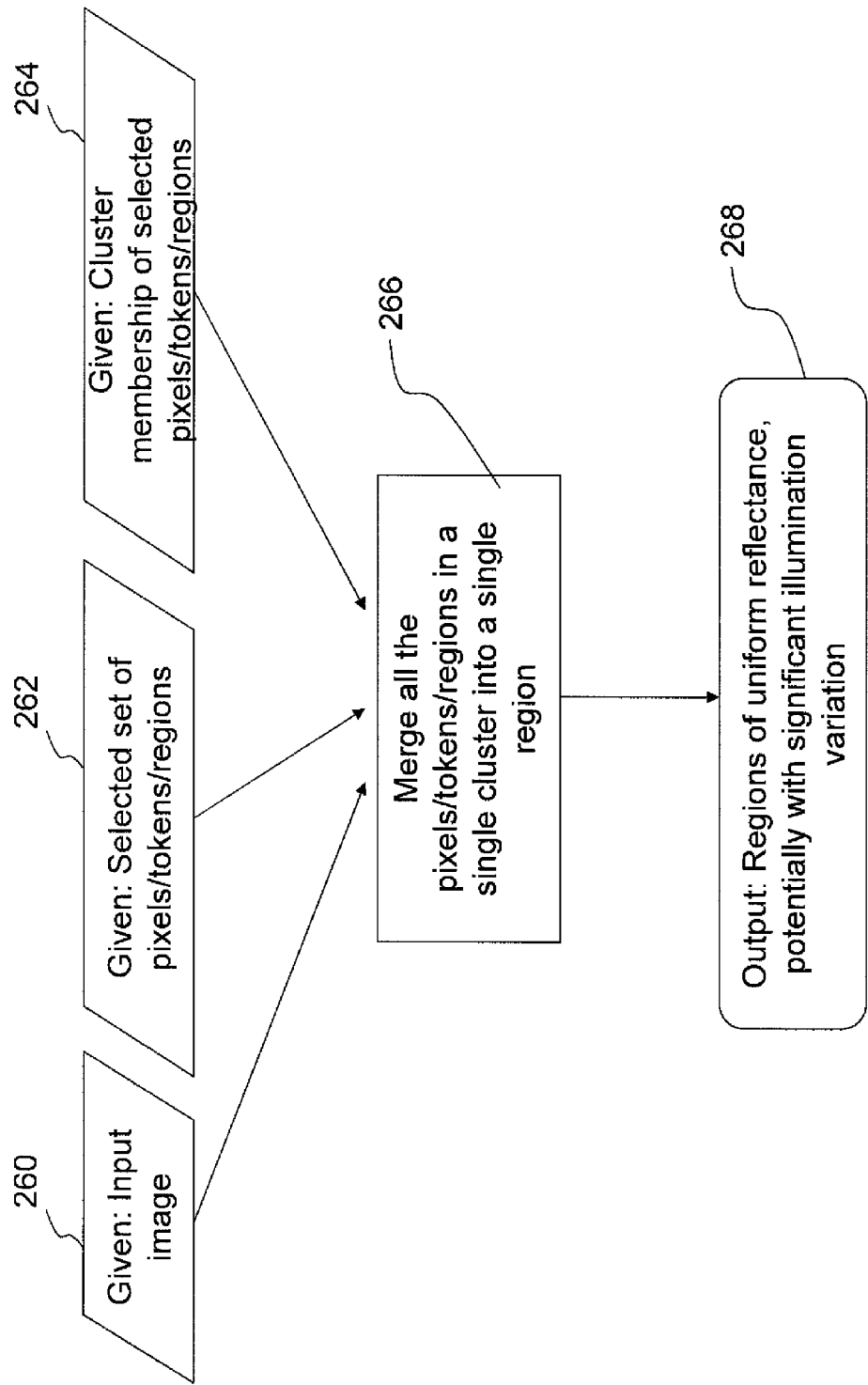
FIG. 12 is a flow chart for detecting regions of uniform reflectance based on the log chromaticity clustering according to a feature of the present invention.

FIG. 12 is a flow chart for detecting regions of uniform reflectance based on the log chromaticity clustering according to a feature of the present invention. In step 260, the corresponding image of input video file 18 is once again provided to the CPU 12. In step 262, one of the pixels or Type C tokens, depending upon the list of colors used in step 250, is input to the CPU 12. In step 264, the cluster membership information, form either steps 244 or 256, is input to the CPU 12.

In step 266, the CPU 12 operates to merge each of the pixels, or specified regions of an input image, such as, for example, Type C tokens, having a same cluster group membership into a single region of the image to represent a region of uniform reflectance (Type B token). The CPU 12 performs such a merge operation for all of the pixels or tokens, as the case may be, for the corresponding image of input video file 18. In step 268, the CPU 12 outputs a list of all regions of uniform reflectance (and also of similar tone mapping intensities and x, y coordinates, if the log chromaticity coordinates were augmented in steps 234 and/or 236). It should be noted that each region of uniform reflectance (Type B token) determined according to the features of the present invention, potentially has significant illumination variation across the region.

U.S. Patent Publication No. US 2010/0142825 teaches a constraint/solver model for segregating illumination and material in an image, including an optimized solution based upon a same material constraint. A same material constraint, as taught in U.S. Patent Publication No. US 2010/0142825, utilizes Type C tokens and Type B tokens, as can be determined according to the teachings of the present invention. The constraining relationship is that all Type C tokens that are part of the same Type B token are constrained to be of the same material. This constraint enforces the definition of a Type B token, that is, a connected image region comprising contiguous pixels that represent a region of the image encompassing a single material (same reflectance) in the scene, though not necessarily the maximal region corresponding to that material. Thus, all Type C tokens that lie within the same Type B token are by the definition imposed upon Type B tokens, of the same material, though not necessarily of the same illumination. The Type C tokens are therefore constrained to correspond to observed differences in appearance that are caused by varying illumination.

Figure 13:
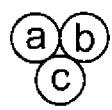
FIG. 13 is a representation of an [A][x]=[b] matrix relationship used to identify and separate illumination and material aspects of an image, according to a same-material constraint, for generation of intrinsic images.

FIG. 13 is a representation of an [A][x]=[b] matrix relationship used to identify and separate illumination and material aspects of an image, according to a same-material constraint, as taught in U.S. Patent Publication No. US 2010/0142825. Based upon the basic equation I=ML (I=the recorded image value, as stored in a video file 18, M=material reflectance, and L=illumination), $\log(I)=\log(ML)=\log(M)+\log(L)$. This can be restated as $i=m+l$, wherein i represents $\log(I)$, m represents $\log(M)$ and l represents $\log(L)$. In the constraining relationship of a same material, in an example where three Type C tokens, a, b and c, (as shown in FIG. 13) are within a region of single reflectance, as defined by a corresponding Type B token defined by a, b and c, then $m_a=m_b=m_c$. For the purpose of this example, the I value for each Type C token is the average color value for the recorded color values of the constituent pixels of the token. The a, b and c, Type C tokens of the example can correspond to the blue Type B token illustrated in FIG. 3d.

Since: $m_a=i_a-l_a$, $m_b=i_b-l_b$, and $m_c=i_c-l_c$, these mathematical relationships can be expressed, in a same material constraint, as $(1)l_a+(-1)l_b+(0)l_c=(i_a-i_b)$, $(1)l_a+(0)l_b+(-1)l_c=(i_a-i_c)$ and $(0)l_a+(1)l_b+(-1)l_c=(i_b-i_c)$.

Thus, in the matrix equation of FIG. 13, the various values for the $\log(I)$ ($i_a$, $i_b$, $i_c$), in the [b] matrix, are known from the average recorded pixel color values for the constituent pixels of the adjacent Type C tokens a, b and c. The [A] matrix of 0's, 1's and −1's, is defined by the set of equations expressing the same material constraint, as described above. The number of rows in the [A] matrix, from top to bottom, corresponds to the number of actual constraints imposed on the tokens, in this case three, the same material constraint between the three adjacent Type C tokens a, b and c. The number of columns in the [A] matrix, from left to right, corresponds to the number of unknowns to be solved for, again, in this case, the three illumination values for the three tokens. Therefore, the values for the illumination components of each Type C token a, b and c, in the [x] matrix, can be solved for in the matrix equation, by the CPU 12. It should be noted that each value is either a vector of three values corresponding to the color bands (such as red, green, and blue) of our example or can be a single value, such as in a grayscale image.

Figure 14:
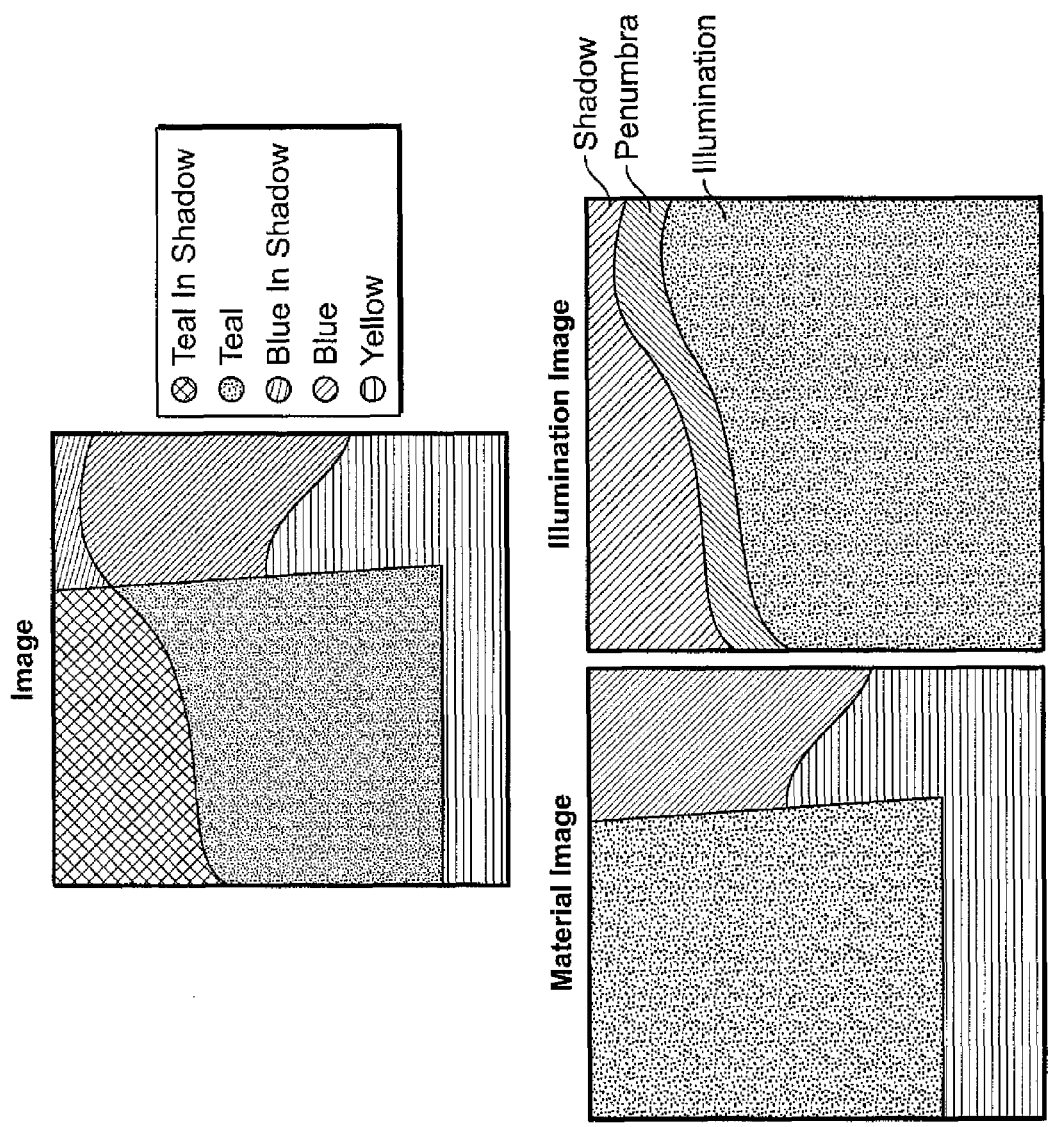
FIG. 14 illustrates intrinsic images including an illumination image and a material image corresponding to the original image of FIG. 3b.

Once the illumination values are known, the material color can be calculated by the CPU 12 using the I=ML equation. Intrinsic illumination and material images can be now be generated for the region defined by tokens a, b and c, by replacing each pixel in the original image by the calculated illumination values and material values, respectively. An example of an illumination image and material image, corresponding to the original image shown in FIG. 3b, is illustrated in FIG. 14.

According to a feature of a further exemplary embodiment of the present invention, the CPU 12 is coupled to an object database 24. As noted above, the object database 24 stores a list of objects that can appear in the video files 18, and information on the material make-up and material reflectance colors for each object stored in the database 24. In connection with the above-described techniques for segregating an image into corresponding material reflectance and illumination intrinsic images, the CPU 12 is operated to perform a known object recognition task, such as, for example, a SIFT technique, to identify objects in an image being processed.

Upon the identification of an object in a scene depicted in an image being processed, the CPU 12 accesses the object database 24 for the material reflectance color information relevant to the identified object. The CPU 12 is then operated to correlate, for example, any Type C tokens in the image being processed that constitute the identified object. The material reflectance color information for the identified object can then be used to specify, for example, a fixed material color anchor value added to the matrix equation shown in FIG. 13, to constrain the Type C tokens constituting the identified object, to thereby segregate the tokens constituting the identified object in an image being processed, into the corresponding intrinsic material reflectance and illumination aspects of the object.

According to yet another feature of the exemplary embodiment, the CPU 12 is coupled to the Internet 26. In this manner, the CPU 12 can access websites 28 on the Internet 26. The websites 28 provide another source for an object database. For example, the CPU 12 can search the Internet 26 via, for example, a text-based search, to obtain information at an accessed website 28, relevant to the material characteristics of an object identified in an image being processed. The material characteristics are used to determine the fixed anchor value described above.

Implementation of the constraint/solver model according to the techniques and teachings of U.S. Patent Publication No. US 2010/0142825, utilizing, for example, the Type C tokens and Type B tokens obtained, for example, via a log chromaticity clustering technique according to the present invention, and information from an object database 26, provides a highly effective and efficient method for generating intrinsic images corresponding to an original input image. The intrinsic images can be used to enhance the accuracy, speed and efficiency of image processing, image analysis and computer vision applications.

According to yet another feature of the present invention, advantage is made of a correspondence between inherent characteristics of each of the intrinsic material reflectance and illumination images with observations of human visual perception. As observed, human perception of details of objects depicted in a scene recorded in an video file 18 is aligned with the details depicted in the intrinsic images for the material reflectance aspects of the scene. Moreover, human perception of motion depicted in a sequence of images for the scene is aligned with motion displayed in a sequence of intrinsic images for the illumination aspects of the scene.

Humans tend to perceive fine spatial detail with more clarity in static or slow-moving regions of a video and tend to perceive fast motion more clearly in larger spatial objects or regions of a video. In order to allow perception of both the fine details and the fast motion, conventional video compression techniques maintain high frame rates to allow for perception of smooth motion and high spatial resolution for perception of fine detail.

Figure 15:
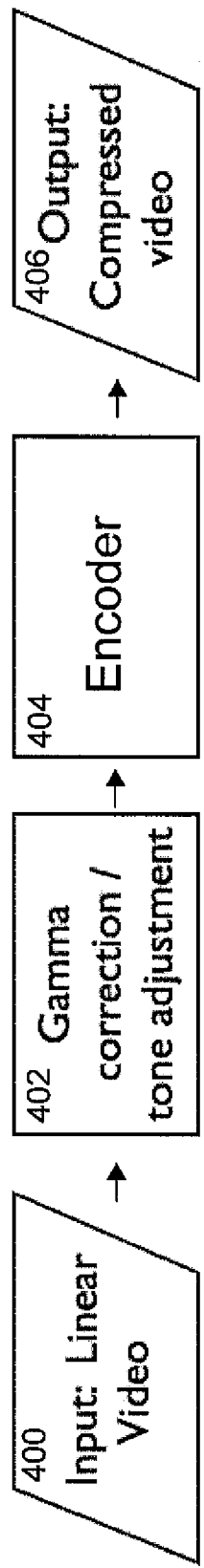
FIG. 15 shows a flow chart of a linear video stored in a video file being compressed in accordance with a conventional video compression method.

FIG. 15 shows a flow chart of a linear video stored in a video file 18 being compressed in accordance with a conventional video compression method for filtering, compression or other processing. A linear video is formed by a stream of video frames that are in an ordered sequence. For example, a first frame F1 is followed by a second frame F2, which is followed by a third frame F3, etc. . . . In step 400, a video file is received at a computer. In a step 402, gamma correction and/or tone adjustment are performed on the linear video. In a step 404, the linear video is compressed or encoded for transmission or storage. An encoder proceeds to compress or encode the linear video according to a known compression format such as H.264/AVC, HEVC or another format. Then, in a step 406, the compressed video is stored by the computer and/or transmitted, for example, via the Internet, to a remote device. In this conventional method, the compressed video at step 406 has the same number of frames as the linear video at step 400.

Embodiments of the present invention allow the material component and the illumination component of a video to be separated from each other in a precompression technique into an independent material video and an independent illumination video for filtering. Such separation of the material and illumination videos allows adjustments to be made to the material and illumination video frames making up the video independently of each other for further reduction in video file size, yet maintaining aspects of the original video frames that are most important for human perception of videos. Because videos are formed of sequential images, it is possible to alter or remove individual video frames of the video without affecting the quality of the video from a human perception standpoint. Due to the importance of material reflectance of an image for fine details and object boundaries in a video, but not necessarily the shape and movement, it is possible to reduce the frame rate of the material images for storage or transmission without affecting the quality of the video from a human perception standpoint. Also, due to the importance of illumination of an image for the shape and movement in a video, but not necessarily the fine details and object boundaries, it is possible to reduce the detail of the illumination images storage or transmission without affecting the quality of the video from a human perception standpoint.

Figure 16:
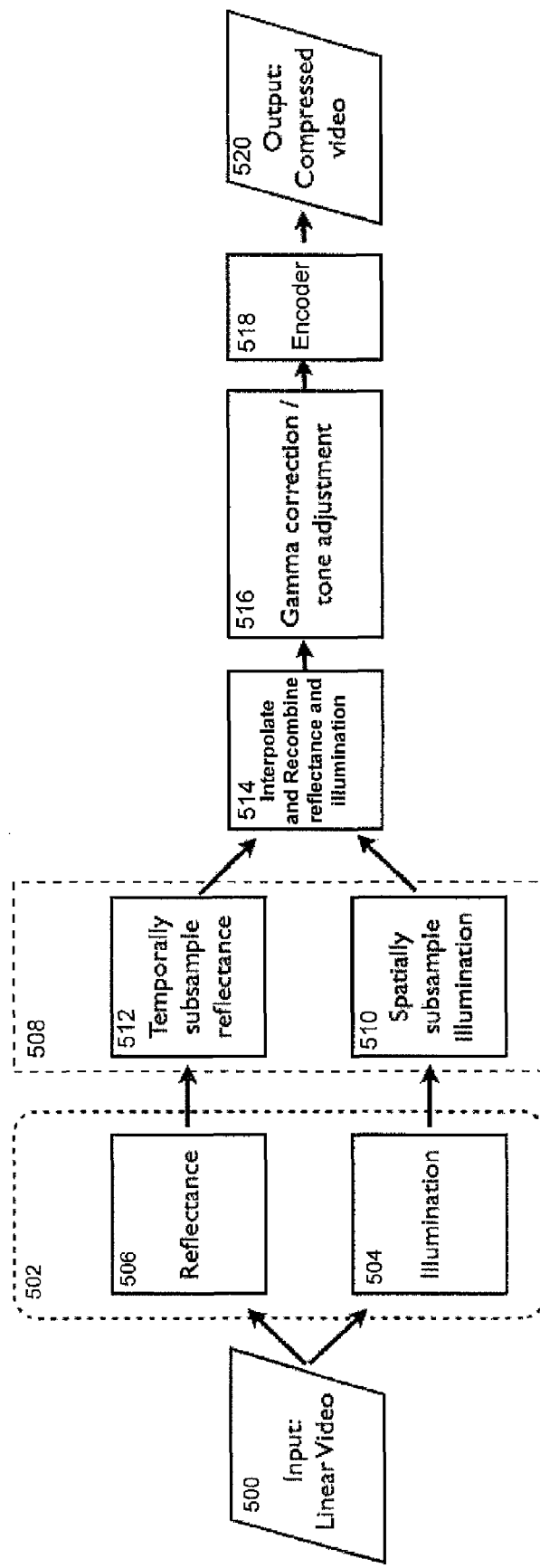
FIG. 16 shows a flow chart for processing a linear video, according to an embodiment of the present invention.

FIG. 16 shows a flow chart for processing a linear video, according to an embodiment of the present invention. The video processing method shown in FIG. 16 reduces the material reflectance component of the linear video temporally and reduces the illumination component of the linear video spatially to further reduce the size of the linear video for transmission and/or storage, as compared with the conventional method described with respect to FIG. 15, but essentially maintaining the quality of the video from a human perception standpoint. Such further reduction in file size allows for more efficient storage and faster data transmission. In one alternative embodiment, the material reflectance component of the linear video may be reduced temporally, without reducing the illumination component of the linear video spatially. In another alternative embodiment, the illumination component of the linear video may be reduced spatially, with reducing the material reflectance component of the linear video temporally. These alternative embodiments still beneficially reduce the size of the video file.

In step 500, the CPU 12 receives an original video file, for example, a video file 18 from the memory 16. In step 502, the CPU 12 operates to generate intrinsic images from the each of the video frames of the original video file, for example, according to the techniques described in detail above, to output illumination maps (illumination video frames forming an illumination video) (step 504) and reflectance maps (material video frames forming a material video) (step 506).

In step 508, the CPU 12 operates to separately perform, either in a parallel operation, or in a sequence, an illumination component filtering on the illumination video frames in step 510 and a material component filtering on the material video frames in step 512. In this embodiment, the illumination component filtering in step 510 includes spatially subsampling the illumination video and the material component filtering in step 512 includes temporally subsampling the material video. The spatial subsampling of the illumination video may include reducing the spatial resolution of each of the illumination video frames of the illumination video. For example, the spatial resolution of illumination video frames may reduced both horizontally and vertically by a factor of two, such that a spatial resolution W×H of the illumination video frames is reduced to W/2×H/2 while not affecting the frame rate F. The spatial resolution of the illumination video frames of the illumination video may also be decreased during the spatial subsampling by other amounts in other examples. The temporal subsampling of the material video may include removing j material video frame(s) out of every k material video frames of the material video in a repeating pattern. For example, where j=1 and k=2, every other material video frame is removed from the material video, in a repeating pattern of removing the first video frame of each group of two video frames and leaving the second video frame of the group of two video frames or in a repeating pattern of removing the second video frame of each group of two video frames and leaving the first video frame of the group of two video frames.

Also, for example, where j=2 and k=3, two out of every three material video frames may be removed from the material video during the temporal subsampling in a first repeating pattern where the first and second material video frames of each group of three material video frames are removed and the third material video frame of the group of three material video frames is not removed, a second repeating pattern where the first and third material video frames of each group of three material video frames are removed and the second material video frame of the group of three material video frames is not removed, or a third repeating pattern where the second and third material video frames of each group of three material video frames are removed and the first material video frame of the group of three material video frames is not removed.

The foregoing examples are merely illustrative and the number of material video frames of the material video removed and/or the pattern of removal may also be varied during the temporal subsampling by other amounts in other examples.

The spatial subsampling and the temporal subsampling reduce the sizes of the illumination video and the material video, reducing the size of the video file storing the illumination and material videos. In step 510, the CPU 12 may perform one or more alternative or additional filtering processes on each of the illumination video frames and in step 512, the CPU 12 may perform one or more alternative or additional filtering processes on each of the material video frames.

Figure 17:
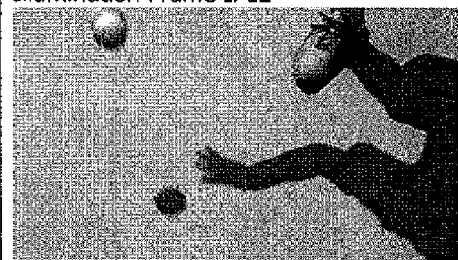
FIG. 17 shows an example of spatially subsampling an illumination video by spatially reducing each of the illumination video frames.

FIG. 17 shows an example of spatially subsampling an illumination video by reducing each of the illumination video frames by a factor of two horizontally and vertically from a spatial resolution W×H to W/2×H/2. Five exemplary illumination video frames, frames IF 12 to IF 16, of a illumination video are shown. The spatial resolution of each of the illumination video frames IF12 to IF16 is reduced by a factor of two horizontally and vertically from a spatial resolution W×H to W/2×H/2, without altering the frame rate F of the illumination video.

Figure 18:
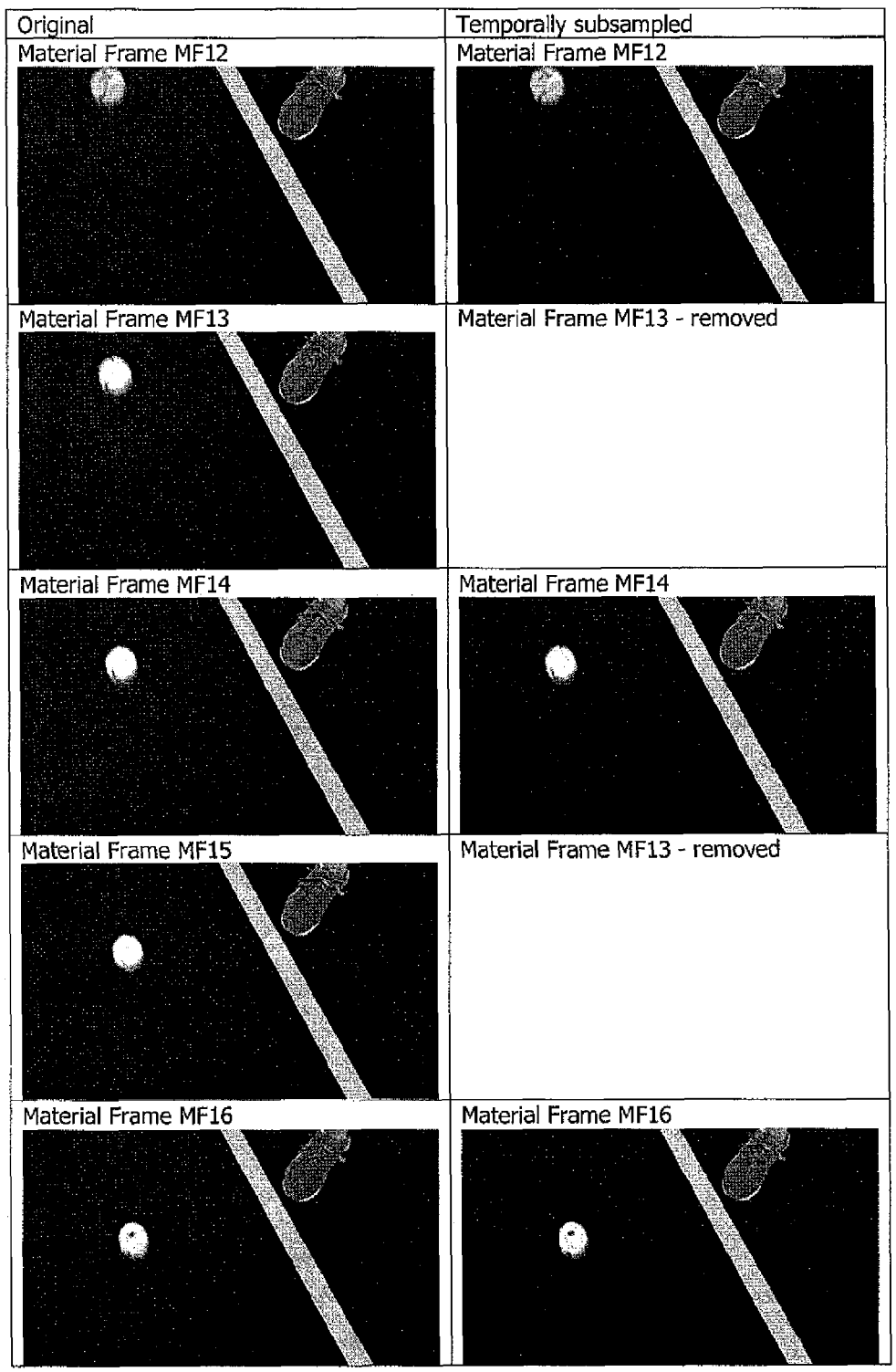
FIG. 18 shows an example of temporally subsampling a material video by reducing the number of material video frames.

FIG. 18 shows an example of temporally subsampling a material video by reducing the number of material video frames by a factor of two from a frame rate F to a frame rate F/2. Five sequential exemplary material video frames, frames MF12 to MF16, of a material video are shown. The frame rate F of the material video is reduced by a factor of two from a frame rate F to a frame rate F/2 by removing material video frame MF13 and material video frame MF 15, without altering the spatial resolution W×H of frames MF12, MF14, MF16.

In a step 514, the CPU 12 operates to separately interpolate the filtered illumination video and the filtered material video and then re-mix the interpolated illumination video and the interpolated material video according to a pixel-by-pixel or sample-by-sample operation to form a recombined intrinsic video. CPU 12 or the remote device operates to perform, either in a parallel operation, or in a sequence, separate interpolation processes on the filtered illumination video and the filtered reflectance video. In this embodiment, the file size of the interpolated illumination video and the interpolated material video are reduced compared the corresponding illumination video and material video created in step 508.

The interpolating may include creating interpolated illumination frames from the filtered illumination frames created in the illumination component subsampling in step 508. The interpolated illumination frames may be formed by interpolating spatially between pairs of horizontally and vertically adjacent pixels of each of the filtered illumination frames created in step 510 to output an interpolated illumination video (step 532). For example, referring to FIG. 17, illumination frames IF12 to IF16 formed by spatial subsampling may each be up-sampled by interpolating pixels spatially between pair of horizontally and vertically adjacent pixels. As mentioned in the example of FIG. 17, the filtered illumination frames IF12 to IF16 have the spatial dimensions W/2×H/2 and the frame rate F. For this example, the interpolating results in a video including a sequence of interpolated illumination frames at the original spatial resolution w×h and frame rate F.

The interpolating may also include creating interpolated material frames to replace the material frames removed in the material component subsampling in step 512. The interpolated material frames may be formed by interpolating each pixel position of a material frame directly preceding the corresponding removed material frame and a material frame directly following the corresponding removed material frame to output an interpolated material video. For example, referring to FIG. 18, material frame MF13 removed during the temporal subsampling may be replaced by an interpolated material frame created by interpolating each pixel position of material frames MF12 and MF14; and material frame MF15 removed during the temporal subsampling may be replaced by an interpolated material frame created by interpolating each pixel position of material frames MF14 and MF16. As mentioned in the example of FIG. 18, the filtered material video has the spatial dimensions W×H and the frame rate F/2. For this example, the interpolating results in a video including a sequence of material frames at the original resolution W×H and frame rate F.

In alternative embodiments, other known methods of interpolation, for example linear interpolation, bilinear interpolation, cubic interpolation or bicubic interpolation can be used in step 514.

In a step 516, gamma correction and/or tone adjustment may be performed on the recombined intrinsic video. In a step 518, the recombined intrinsic video is compressed or encoded for transmission or storage. An encoder (or CPU carrying out the process) proceeds to compress or encode the recombined intrinsic video according to a known compression format such as H.264/AVC, HEVC or another format.

According to a feature of the present invention, in step 520, the compressed recombined intrinsic video (video formed of filtered and interpolated intrinsic images) is stored by the CPU 12 in the memory 16 and/or transmitted, for example, via the Internet 26, to a remote device configured, for example, as a website 28 (see FIG. 1). The remote device comprises, for example, a PC, a smartphone, a tablet computer, or a device in a TV broadcast operation.

Figure 19:
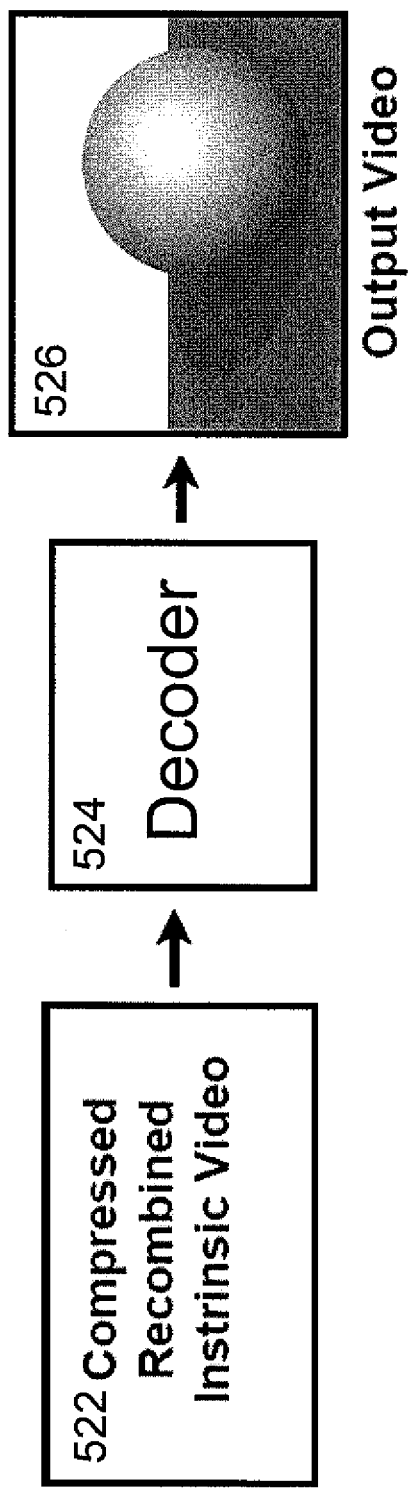
FIG. 19 is a flow chart for decompressing and recombining the compressed recombined filtered intrinsic video stored or transmitted in FIG. 18, according to an embodiment of the present invention.

FIG. 19 is a flow chart for decompressing and recombining the compressed recombined intrinsic video stored or transmitted in step 520 of FIG. 18, according to an embodiment of the present invention. In step 522, depending on whether the compressed recombined intrinsic video is stored or transmitted in step 520, the compressed recombined intrinsic video is retrieved by CPU 12 or received by the remote device as a website 28 via the Internet 26.

In a step 524, a decoder of the CPU 12 or the remote device operates to decompress or decode the compressed recombined intrinsic video.

Each of steps 522 and 524 are implemented using known techniques for compression or decompression of digital video material, such as techniques compatible with one of ISO/MPEG-2 Visual, ITU-T H.264/AVC, HEVC or other known formats for compressed video material.

In step 526, the CPU 12 or the remote device operates to output a video appearing to the human visual system to be of essentially the same video quality as the original video, for example, the video depicted in the video file 18 initially processed by the CPU 12 according to the routine of FIG. 16.

Figure 20:
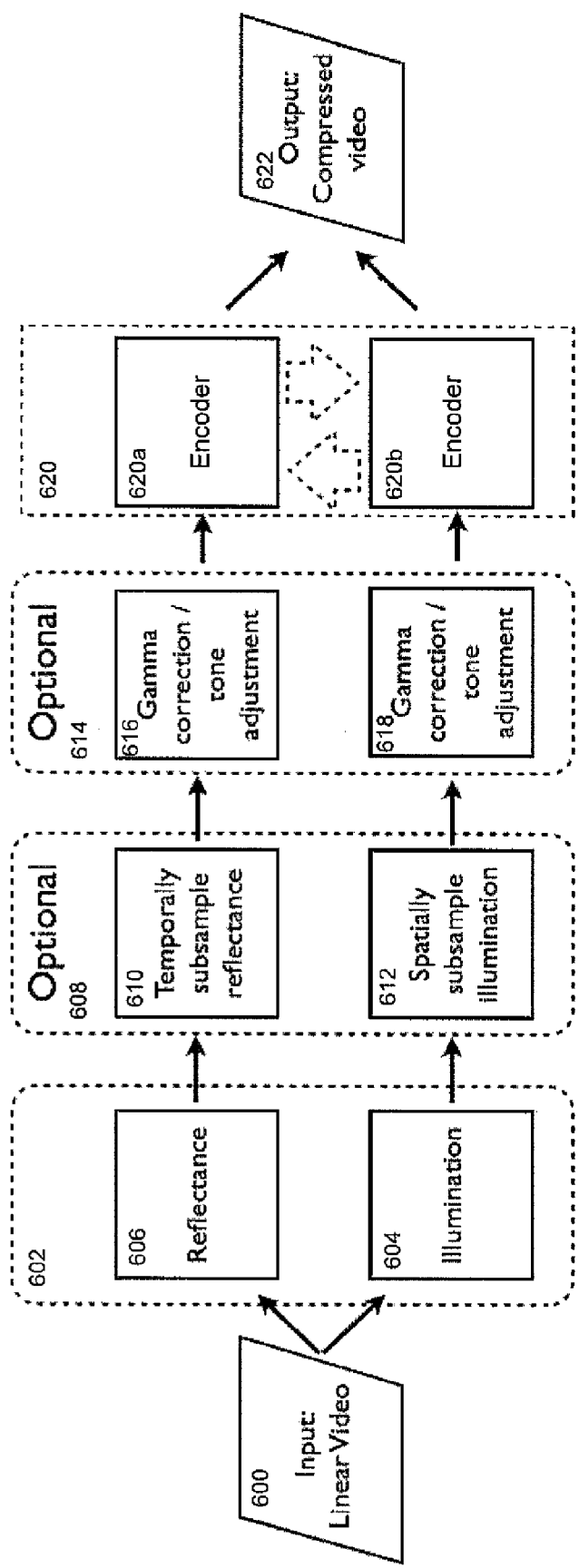
FIG. 20 shows a flow chart for processing a linear video, according to another embodiment of the present invention.

FIG. 20 shows a flow chart for processing a linear video, from video file 18, according to another embodiment of the present invention. The video processing method shown in FIG. 20 reduces the material reflectance component of the linear video temporally and reduces the illumination component of the linear video spatially to further reduce the size of the linear video, as compared with the conventional method described with respect to FIG. 15, but maintaining the quality of the video from a human perception standpoint. Such further reduction in the size of the video file allows for more efficient storage and faster data transmission.

Steps 600, 602, 604, 606 of FIG. 20 are the same as steps 500, 502, 504, 506 of FIG. 16. In step 600, the CPU 12 receives an original video file, for example, a video file 18 from the memory 16. In step 602, the CPU 12 operates to generate intrinsic images from the each of the video frames of the original video file, for example, according to the techniques described in detail above, to output illumination maps (illumination video frames forming an illumination video) (step 604) and reflectance maps (material video frames forming a material video) (step 606).

Steps 608, 610, 612 of FIG. 20 are the same as steps 508, 510, 512 of FIG. 16. In step 608, the CPU 12 operates to separately perform, either in a parallel operation, or in a sequence, an illumination component filtering on the illumination video frames in step 610 and a material component filtering on the material video frames in step 612. In this embodiment, as described above with respect to FIG. 16, the illumination component filtering includes spatially subsampling the illumination video and the material component filtering includes temporally subsampling the material video. The spatial subsampling of the illumination video may include reducing the spatial resolution of each of the illumination video frames of the illumination video. The temporal subsampling of the material video may include reducing the frame rate of the material video by removing j material video frame(s) out of every k material video frames of the material video in a repeating pattern. Steps 610 and 612 may also include additional or alternative filtering operations.

Starting at step 614, the method of FIG. 20 begins to vary from the method of FIG. 16. In a step 614, in contrast to the method of FIG. 16, in which the filtered material and illumination videos are first recombined, the CPU 12 may operate to separately perform either in a parallel operation, or in a sequence, gamma correction and/or tone adjustment on the filtered illumination video (step 616) and the filtered material video (step 618).

In a step 620, the CPU 12 operates to separately compress or encode, either in a parallel operation, or in a sequence, filtered illumination video and the filtered material video, which are performed by separate encoders 620a, 620b, respectively, of CPU 12. For example, the CPU 12 operates to convert the illumination maps to a known sampling format such as RGB, YCrCb or YUV. The CPU 12 then proceeds to compress the converted illumination maps and reflectance maps according to a known compression format such as H.264/AVC, HEVC or another format. The individual encoders 620a, 620b may optionally communicate with each other while compressing the filtered illumination video and the filtered material video, respectively. In one embodiment, steps 610, 612 and/or steps 616, 618 may also be performed by encoders 620a, 620b.

According to a feature of the present invention, in step 622, the compressed filtered illumination video (video formed of filtered and compressed illumination images) and the compressed filtered material video (video formed of filtered and compressed material images), either in a parallel operation, or in a sequence, are stored by the CPU 12 in the memory 16 and/or transmitted, for example, via the Internet 26, to a remote device configured, for example, as a website 28 (see FIG. 1) in the form of two video streams, a stream of the compressed filtered illumination video and a stream of the compressed filtered material video, separately or together. The remote device comprises, for example, a PC, a smartphone, a tablet computer, or a device in a TV broadcast operation.

Figure 21:
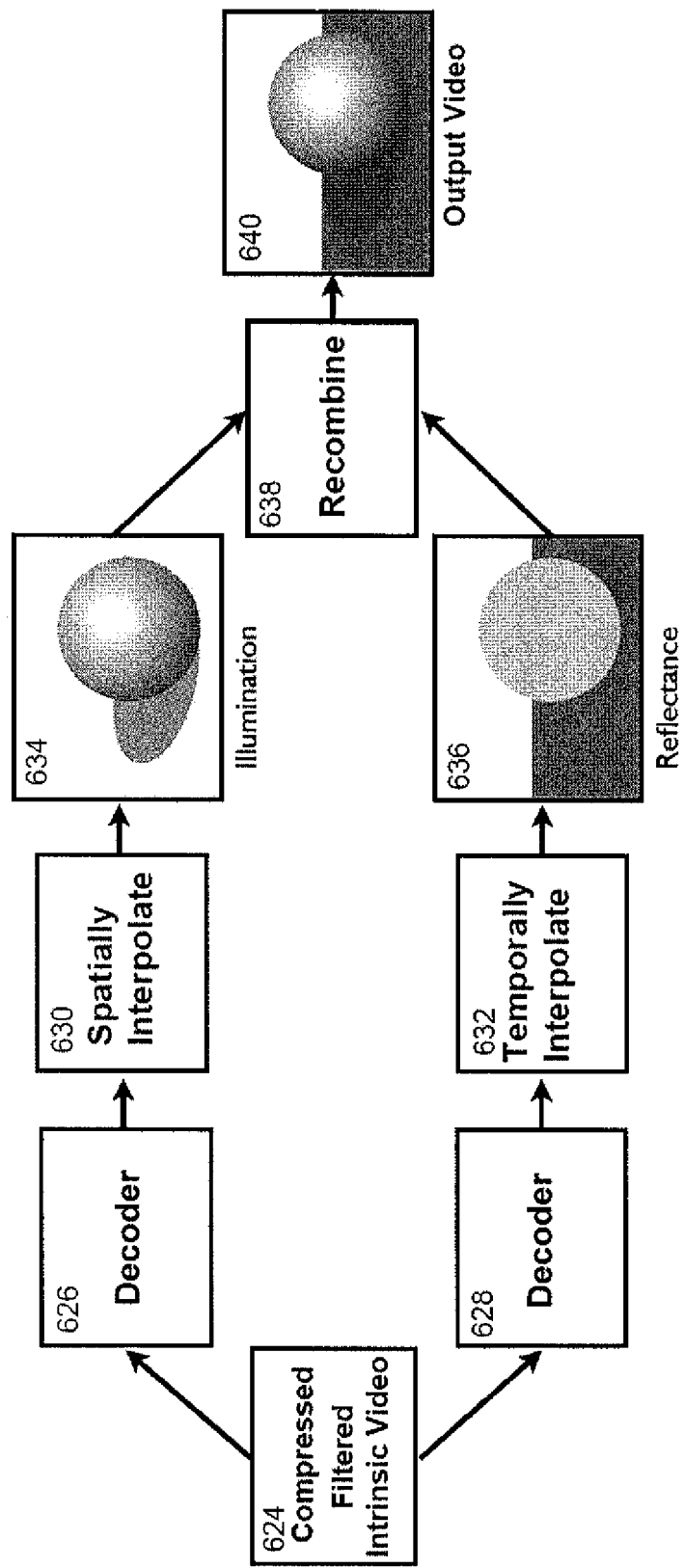
FIG. 21 is a flow chart for decompressing and recombining the compressed filtered illumination video and the compressed filtered material video from FIG. 20, according to an embodiment of the present invention.

FIG. 21 is a flow chart for decompressing and recombining the compressed filtered illumination video and the compressed filtered material video from FIG. 20, according to an embodiment of the present invention. In step 624, depending on whether the compressed recombined filtered intrinsic video is stored or transmitted in step 622, the compressed recombined filtered intrinsic video is retrieved by CPU 12 or received by the remote device as a website 28 via the Internet 26 in the form of two video streams, a stream of the compressed filtered illumination video and a stream of the compressed filtered material video, separately or together.

In steps 626 and 628, in contrast to step 524 of FIG. 19, in which the filtered material video and illumination are decompressed together, separate decoders 620a, 620b of the CPU 12 or the remote device operate to perform, either in a parallel operation, or in a sequence, a decompression or decoding processes.

In decompression process of step 626, decoder 620a performs a decompression process on the compressed version of the illumination video to output the decompressed filtered illumination video.

In decompression process of step 628, decoder 620b performs a decompression process on the compressed version of the material video to output the decompressed filtered reflectance video.

Each of steps 624, 626 and 628 are implemented using known techniques for compression or decompression of digital video material, such as techniques compatible with one of ISO/MPEG-2 Visual, ITU-T H.264/AVC, HEVC or other known formats for compressed video material.

In steps 630, 632, in a similar same manner as in step 514 of figure, CPU 12 or the remote device operates to perform, either in a parallel operation, or in a sequence, a spatial interpolation process on the filtered illumination video and temporal interpolation process on the filtered reflectance video.

Step 630 may include creating interpolated illumination frames from the filtered illumination frames created in the illumination component subsampling in step 610. The interpolated illumination frames by interpolating spatially between pairs of horizontally and vertically adjacent pixels of each of the filtered illumination frames created in step 610 to output an interpolated illumination video (step 634). Step 630 results in an illumination video including a sequence of illumination frames at the original resolution, frame rate F and spatial dimensions W×H.

Step 632 may include creating interpolated material frames to replace the material frames removed in the material component subsampling in step 612. The interpolated material frames may be formed by interpolating each pixel position of a material frame directly preceding the corresponding removed material frame and a material frame directly following the corresponding removed material frame to output an interpolated material video (step 636). Step 632 results in a material video including a sequence of material frames at the original resolution W×H and frame rate F.

In step 638, the CPU 12 or the remote device operates to recombine the illumination video output at step 634 and the material video output at step 636 to output a video appearing to the human visual system to be of essentially the same video quality as the original video (step 640), for example, the video depicted in the video file 18 initially processed by the CPU 12 according to the routine of FIG. 20. The recombined video can be created by the CPU 12 or the remote device using by calculating each of the video frames using the I=ML equation, as fully described above.

Figure 22:
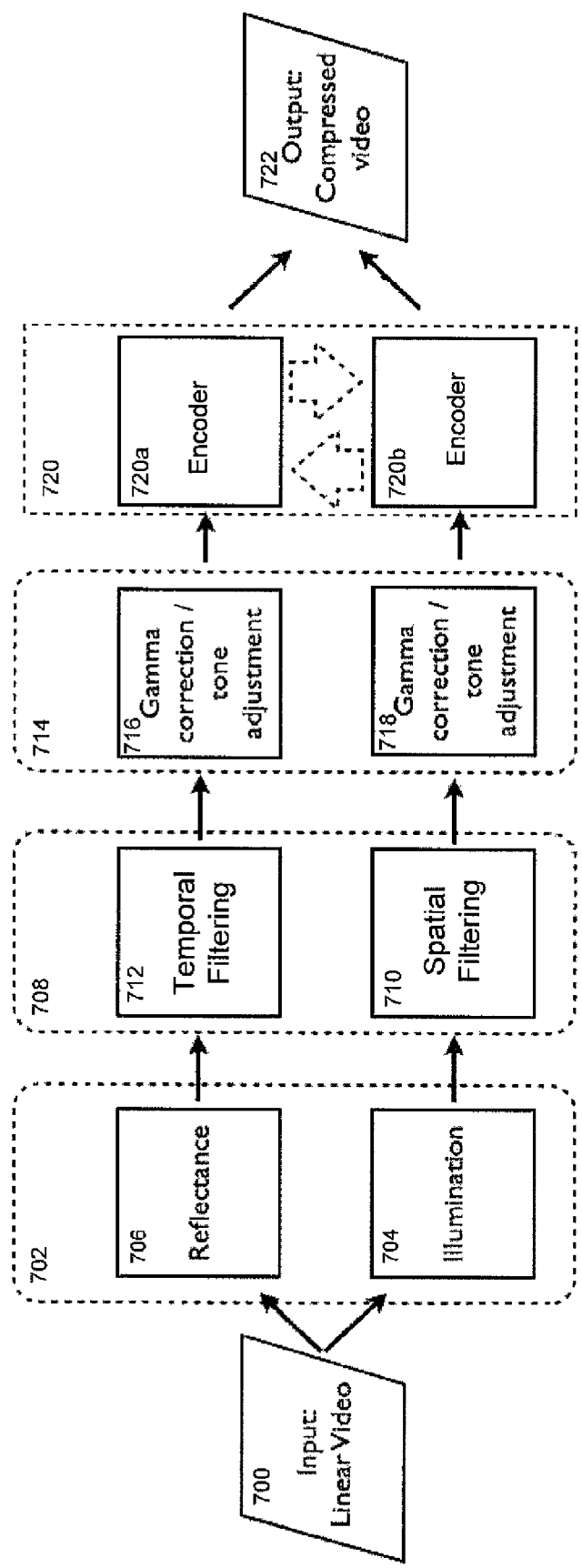
FIG. 22 shows a flow chart for processing a linear video, according to another embodiment of the present invention.

FIG. 22 shows a flow chart for processing a linear video, according to another embodiment of the present invention. The video processing method shown in FIG. 22 reduces the material reflectance component of the linear video temporally and reduces the illumination component of the linear video spatially to further reduce the size of the linear video, as compared with the conventional method described with respect to FIG. 15, but essentially maintaining the quality of the video from a human perception standpoint. Such further reduction in the size of the video file allows for more efficient storage and faster data transmission.

Steps 700, 702, 704, 706 of FIG. 22 are the same as steps 500, 502, 504, 506 of FIG. 16. In step 700, the CPU 12 receives an original video file, for example, a video file 18 from the memory 16. In step 702, the CPU 12 operates to generate intrinsic images from the each of the video frames of the original video file, for example, according to the techniques described in detail above, to output illumination maps (illumination video frames forming an illumination video) (step 704) and reflectance maps (material video frames forming a material video) (step 706).

In step 708, the CPU 12 operates to separately perform, either in a parallel operation, or in a sequence, an illumination component filtering on the illumination video frames in a step 710 and a material component filtering on the material video frames in a step 712. In this embodiment, in contrast with the methods of FIGS. 16 and 20, the illumination component filtering includes spatially or other type of filtering the illumination video frames, to reduce the information content, without actually reducing the spatial resolution W×h of the illumination video frames. The material component filtering includes temporally or other type of filtering the material video frames, to reduce the information content, without actually reducing the frame rate F.

The filtering reduce the sizes of the illumination video and the material video. Filters may be properly chosen such that the size reduction and quality performance is adjusted to be essentially identical to the method described with respect to FIGS. 16 and 19 and the method described with respect to FIGS. 20 and 21. The filtering may be performed by any appropriate filtering technique or techniques, including for example motion compensating filters, spatio-temporal filters, wavelet filters, subband filters.

Steps 714, 716, 718, 720, 722 of FIG. 22 are the same as steps 614, 616, 618, 620, 622 of FIG. 20. In a step 714, the CPU 12 may operate to separately perform, either in a parallel operation, or in a sequence, gamma correction and/or tone adjustment on the filtered illumination video (step 716) and the filtered material video (step 718).

In a step 720, the CPU 12 operates to separately compress or encode, either in a parallel operation, or in a sequence, filtered illumination video and the filtered material video, which are performed by separate encoders 720a, 720b, respectively, or CPU 12. For example, the CPU 12 operates to convert the illumination maps to a known sampling format such as RGB, YCrCb or YUV. The CPU 12 then proceeds to compress the converted illumination maps and reflectance maps according to a known compression format such as H.264/AVC, HEVC or another format. The individual encoders 720a, 720b may optionally communicate with each other while compressing the filtered illumination video and the filtered material video, respectively.

According to a feature of the present invention, in step 722, the compressed filtered illumination video (video formed of filtered and compressed illumination images) and the compressed filtered material video (video formed of filtered and compressed material images), either in a parallel operation, or in a sequence, are stored by the CPU 12 in the memory 16 and/or transmitted, for example, via the Internet 26, to a remote device configured, for example, as a website 28 (see FIG. 1). The remote device comprises, for example, a PC, a smartphone, a tablet computer, or a device in a TV broadcast operation.

Figure 23:
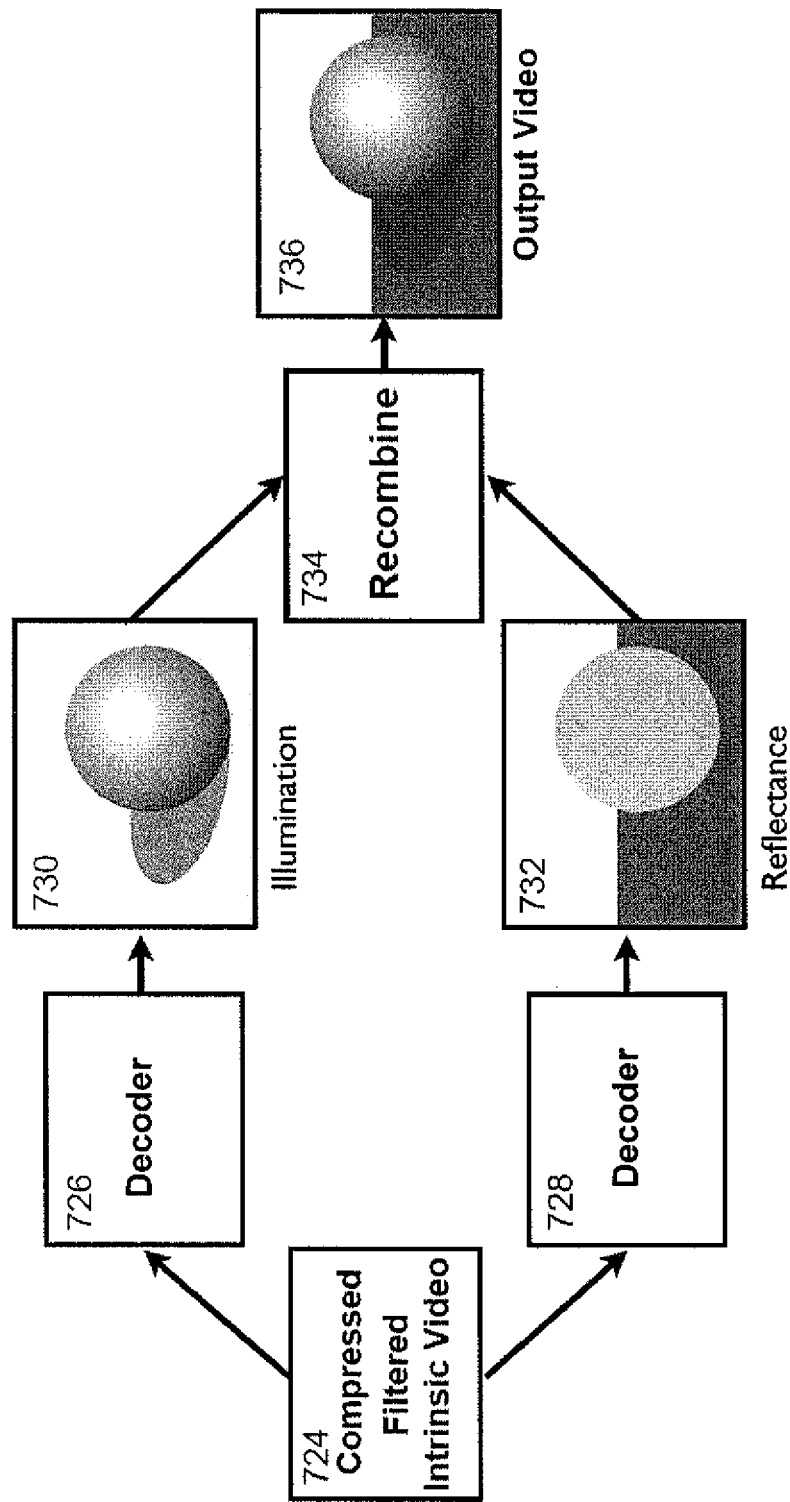
FIG. 23 is a flow chart for decompressing and recombining the compressed filtered illumination video and the compressed filtered material video described with respect to FIG. 22, according to an embodiment of the present invention.

FIG. 23 is a flow chart for decompressing and recombining the compressed filtered illumination video and the compressed filtered material video described with respect to FIG. 22, according to an embodiment of the present invention. The steps of FIG. 23 are the same as the steps of FIG. 21, except that the filtered illumination video and the filtered material video are not interpolated.

In step 724, depending on whether the compressed recombined filtered intrinsic video is stored or transmitted in step 722, the compressed recombined filtered intrinsic video is retrieved by CPU 12 or received by the remote device as a website 28 via the Internet 26.

In steps 726 and 728, decoders 720a, 720b of the CPU 12 or the remote device operate to perform, either in a parallel operation, or in a sequence, decompression (decoding) processes.

In decompression process of step 726, decoder 720a performs a decompression process on the compressed version of the illumination video to output the decompressed filtered illumination video (step 730).

In decompression process of step 728, decoder 720b performs a decompression process on the compressed version of the material video to output the decompressed filtered reflectance video (732).

Each of steps 724, 726 and 728 are implemented using known techniques for compression or decompression of digital video material, such as techniques compatible with one of ISO/MPEG-2 Visual, ITU-T H.264/AVC, HEVC or other known formats for compressed video material.

In step 734, the CPU 12 or the remote device operates to recombine the illumination video output at step 730 and the material video output at step 732 to output a video appearing to the human visual system to be of essentially the same video quality as the original video (step 736), for example, the video depicted in the video file 18 initially processed by the CPU 12 according to the routine of FIG. 23. The recombined video can be created by the CPU 12 or the remote device using by calculating each of the video frames using the I=ML equation, as fully described above.

Figure 24:
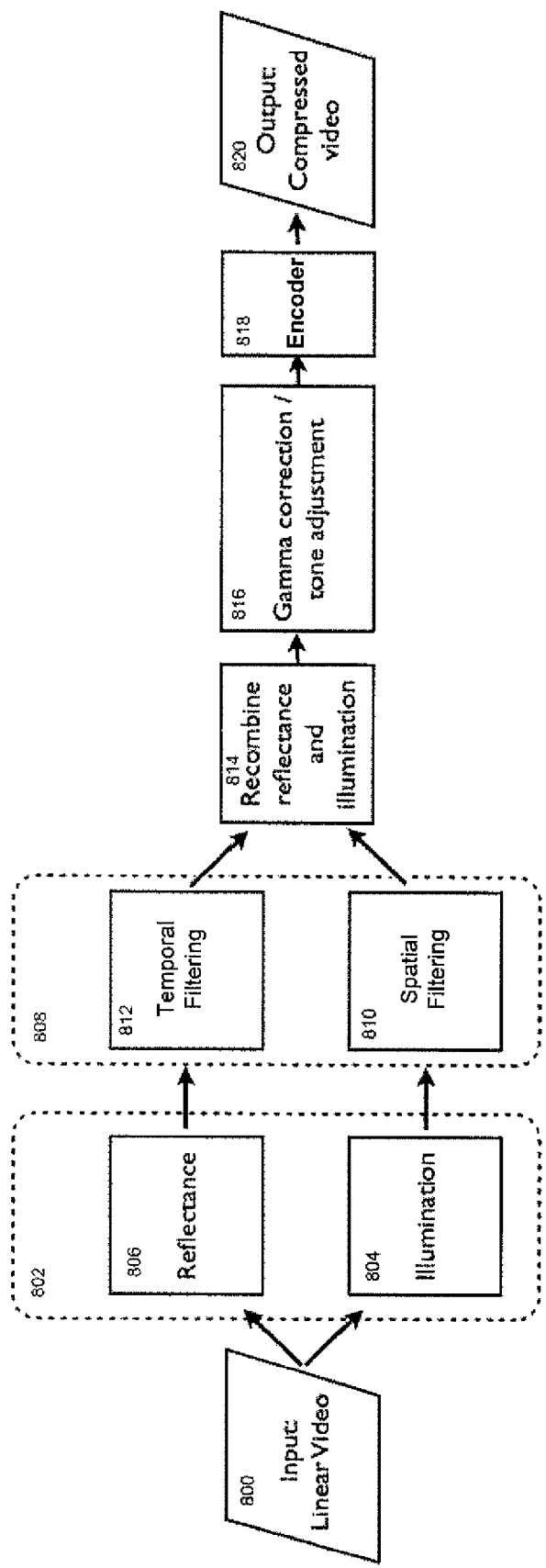
FIG. 24 shows a flow chart for processing a linear video, according to another embodiment of the present invention.

FIG. 24 shows a flow chart for processing a linear video, according to another embodiment of the present invention. The video processing method shown in FIG. 24 reduces the material reflectance component of the linear video temporally and reduces the illumination component of the linear video spatially to further reduce the size of the linear video, as compared with the conventional method described with respect to FIG. 15, but essentially maintaining the quality of the video from a human perception standpoint. Such further reduction in the size of the video file allows for more efficient storage and faster data transmission. The steps of FIG. 24 are the same as the steps of FIG. 16, except that in the method of FIG. 24, like the method of FIG. 22, the illumination component filtering includes spatially filtering the illumination video frames, to reduce the information content, without actually reducing the spatial resolution W×H of the illumination video frames. Also, like the method of FIG. 22, the material component filtering includes temporally filtering the material video frames, to reduce the information content, without actually reducing the frame rate F.

Steps 800, 802, 804, 806 of FIG. 24 are the same as steps 500, 502, 504, 506 of FIG. 16. In step 800, the CPU 12 receives an original video file, for example, a video file 18 from the memory 16. In step 802, the CPU 12 operates to generate intrinsic images from the each of the video frames of the original video file, for example, according to the techniques described in detail above, to output illumination maps (illumination video frames forming an illumination video) (step 804) and reflectance maps (material video frames forming a material video) (step 806).

Steps 808, 810, 812 are the same as the steps 708, 710, 712 of FIG. 22. In step 808, the CPU 12 operates to separately perform, either in a parallel operation, or in a sequence, an illumination component filtering on the illumination video frames in a step 810 and a material component filtering on the material video frames in a step 812. In this embodiment, in contrast with the methods of FIGS. 16 and 20, the illumination component filtering includes spatially filtering the illumination video frames, to reduce the information content, without actually reducing the spatial resolution W×h of the illumination video frames. The material component filtering includes temporally filtering the material video frames, to reduce the information content, without actually reducing the frame rate F.

Spatial and temporal filters may be properly chosen such that the reduction in size and quality performance is adjusted to be essentially identical to the method described with respect to FIGS. 16 and 19 and the method described with respect to FIGS. 20 and 21. The spatial filtering and the temporal filtering may be performed by any appropriate filtering technique or techniques, including for example motion compensating filters, spatio-temporal filters, wavelet filters, subband filters.

In a step 814, the CPU 12 operates to re-mix the filtered illumination video and the filtered material video according to a pixel-by-pixel or sample-by-sample operation to form a recombined filtered intrinsic video including both the filtered illumination video frames and the filtered material video frames.

In a step 816, the CPU 12 may operate to separately perform gamma correction and/or tone adjustment on the recombined intrinsic video.

In a step 818, an encoder of CPU 12 compresses or encodes the recombined filtered intrinsic video for transmission or storage. The encoder proceeds to compress or encode the recombined filtered intrinsic video according to a known compression format such as H.264/AVC, HEVC or another format.

According to a feature of the present invention, in step 820, the compressed recombined filtered intrinsic video (video formed of filtered intrinsic images) is stored by the CPU 12 in the memory 16 and/or transmitted, for example, via the Internet 26, to a remote device configured, for example, as a website 28 (see FIG. 1). The remote device comprises, for example, a PC, a smartphone, a tablet computer, or a device in a TV broadcast operation.

Figure 25:
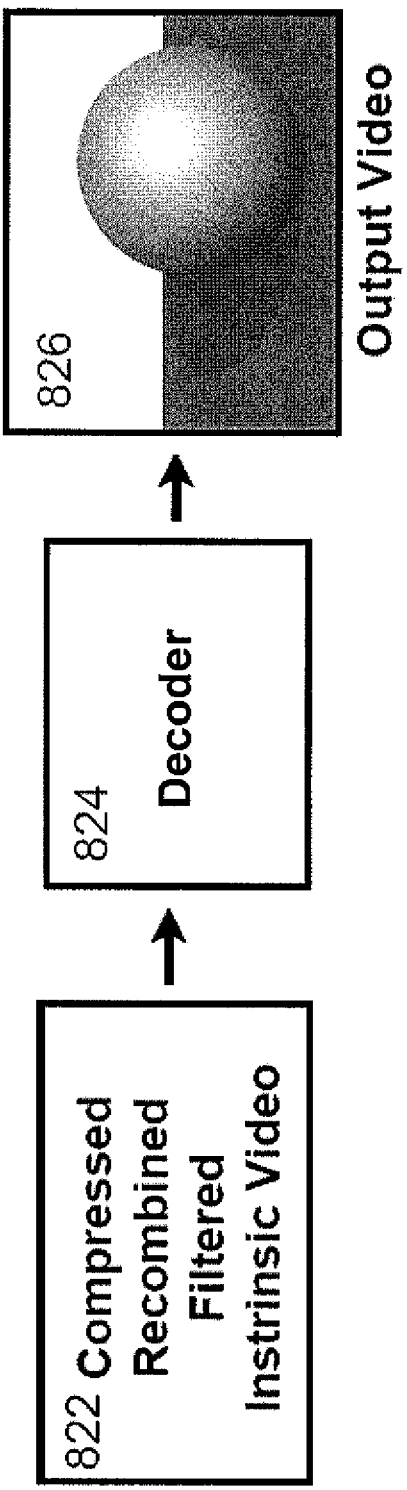
FIG. 25 is a flow chart for decompressing the compressed recombined filtered intrinsic video from FIG. 24, according to an embodiment of the present invention.

FIG. 25 is a flow chart for decompressing the compressed recombined filtered intrinsic video from FIG. 24, according to an embodiment of the present invention. The steps of FIG. 25 are similar to the steps of FIG. 23, in that the illumination video and the material video are not subject to interpolating steps, but different because the illumination video and the material video were previously recombined and are decompressed together by the same decoder. In step 822, depending on whether the compressed recombined filtered intrinsic video is stored or transmitted in step 820, the compressed recombined filtered intrinsic video is retrieved by CPU 12 or received by the remote device as a website 28 via the Internet 26.

In a step 824, a decoder the CPU 12 or the remote device operates to perform a decompression or decoding process on the compressed recombined filtered intrinsic video to output the recombined video (step 826). The decompression or decoding is implemented using known techniques for compression or decompression of digital video material, such as techniques compatible with one of ISO/MPEG-2 Visual, ITU-T H.264/AVC, HEVC or other known formats for compressed video material. The output video appears to the human visual system to be of essentially the same video quality as the original video (step 736), for example, the video depicted in the video file 18 initially processed by the CPU 12 according to the routine of FIG. 24. The recombined video can be created by the CPU 12 or the remote device using by calculating each of the video frames using the I=ML equation, as fully described above.

According to yet another feature of the present invention, instead of segregating a video file into illumination and material videos, the video file is subject to a scale separation operation. Scale separation is a technique for separating local variation within an image from global variation. An image is separated into large-scale features and small-scale features. A known method for performing scale separation on an image is described in "Fast Bilateral Filtering for the Display of High-Dynamic-Range Images," Fredo Durand and Julie Dorsey, ACM Transactions of Graphics (Proceedings of the ACM SIGGRAPH '02 Conference). Durand and Dorsey describe as scale separation technique that uses a bilateral filter to separate an image into a "level" channel and a "detail" channel. The level channel includes the low frequency components of the image and depicts large scale variations of the image, without details, which are depicted in the detail channel as high frequency components of the image. As such, the level channel is a reasonable approximation of log illumination intensity of the image, and the detail channel is a reasonable approximation of the log material intensity.

It is also known that bilateral filtering can be applied to videos, as is discussed in "Seperable bilateral filtering for fast video preprocessing," Tuan Q. Pham and Lucas J. van Vliet, International Conference on Multimedia and Expo, IEEE, 2005. Pham uses a bilateral filter to reduce the noise in a video before compression, which can improve video compression. The bilateral filter operates temporally as well as in the spatial and intensity dimensions. By blurring away fine details (much of which is noise) but leaving the important large structures of the video, the resulting video stream is a smaller file at the same quality or a file of the same size with higher quality.

Another method of scale separation is described in "Two methods for display of high contrast images," Jack Tumblin and Jessica K. Hodgins, ACM Trans. on Graphics 18, 1, pages 56-94, which describes using a Guassian blur filtering operation that can be used to separate out large-scale features and small-scale features.

With this feature of the present invention, advantage is made of a correspondence between low frequency and high frequency scale separation channels with observations of human visual perception. As observed, human perception of details of objects depicted in a scene recorded in a video file 18 is aligned with the details depicted in high frequency data provided by scale separation operations. Moreover, human perception of motion depicted in a sequence of images for the scene is aligned with motion displayed in a sequence of images formed from low frequency data provided by scale separation operations.

Embodiments of the present invention allow the high frequency component and the low frequency component of a video to be separated from each other in a precompression technique into separate components for filtering. Such separation of the high and low frequency components allows adjustments to be made to the high and low frequency components making up the video independently of each other for further reduction in video file size, yet maintaining aspects of the original video frames that are most important for human perception of videos. It is possible to alter or remove individual video frames of the video without affecting the quality of the video from a human perception standpoint. Due to the importance of high frequency components of an image for fine details and object boundaries in a video, but not necessarily the shape and movement, it may be possible to reduce the frame rate of the high frequency components for storage or transmission without affecting the quality of the video from a human perception standpoint. Also, due to the importance of low frequency components of an image for the shape and movement in a video, but not necessarily the fine details and object boundaries, it is possible to reduce the detail of the low frequency components for storage or transmission without affecting the quality of the video from a human perception standpoint.

Figure 26:
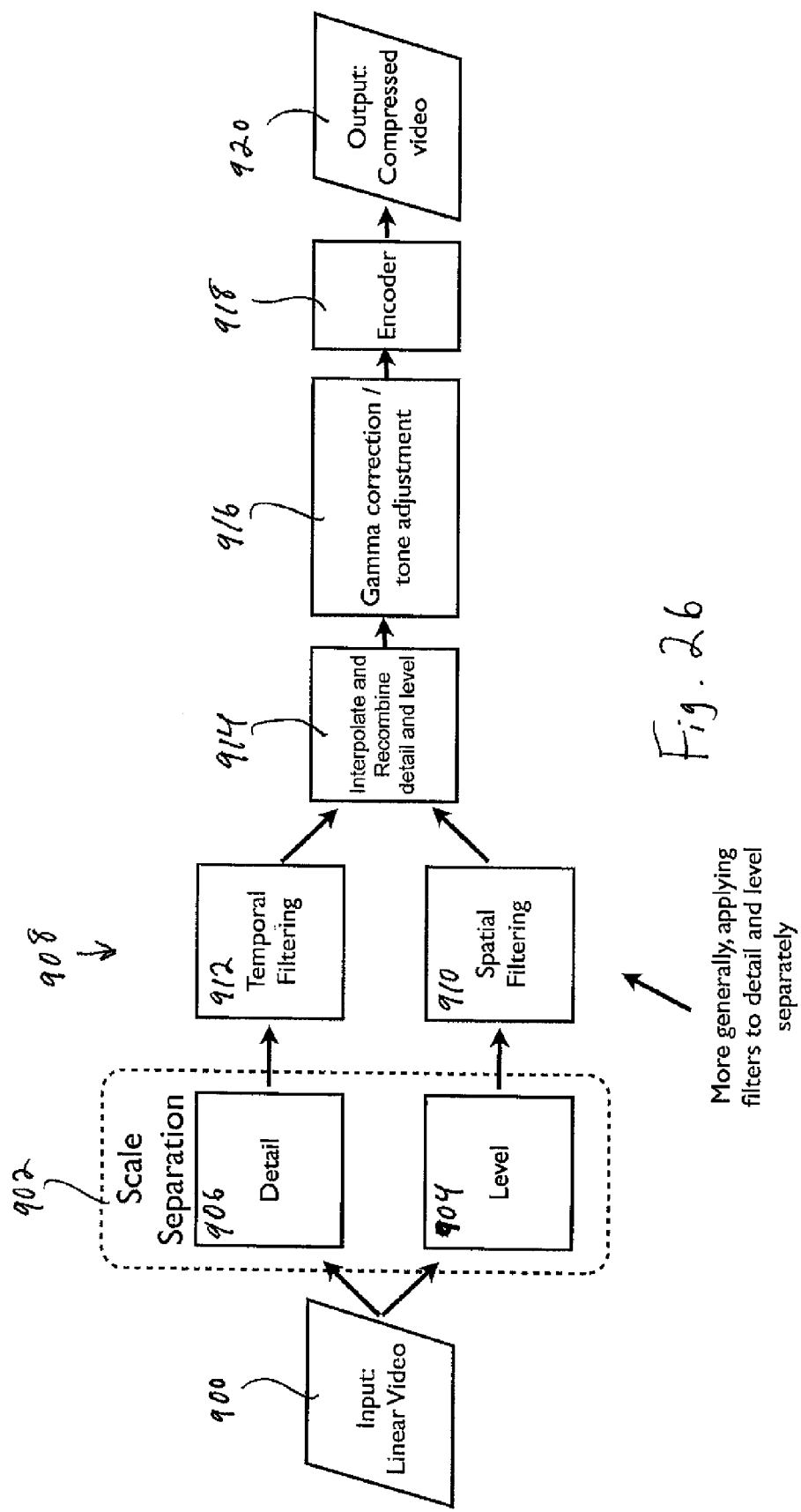
FIGS. 26 to 29 shows flow charts for scale separating and processing videos, according to different embodiments of the present invention.

FIG. 26 shows a flow chart for processing a video, according to another embodiment of the present invention. The video processing method shown in FIG. 26, in contrast with the methods described with respect to FIGS. 16 to 23 involves scale separating a video file, instead of segregating the video file into illumination and material maps. Because the high frequency component resulting from scale separation is an approximation of the material reflectance of an image and the low frequency component resulting from scale separation is an approximation of the illumination component of an image, this embodiment can achieve similar results as the methods described with respect to FIGS. 16 to 23, without the complex processing required to segregate a video file into illumination and material maps.

The video processing method shown in FIG. 26 reduces the high frequency component of the video temporally and reduces the low frequency component of the video spatially to further reduce the size of the video for transmission and/or storage, as compared with the conventional method described with respect to FIG. 15, but essentially maintaining the quality of the video from a human perception standpoint. Such further reduction in file size allows for more efficient storage and faster data transmission. In one alternative embodiment, the high frequency component of the video can be reduced temporally, without reducing the low frequency component of the video spatially. In another alternative embodiment, the low frequency component of the video can be reduced spatially, without reducing the high frequency component of the linear video temporally. These alternative embodiments still beneficially reduce the size of the video file.

In step 900, the CPU 12 receives an original video file, for example, a linear video file 18 from the memory 16. In step 902, the CPU 12 operates to scale separate the video file to output low frequency components—the larger structures—in a level video (step 904) and high frequency components—the details—in a detail video (step 906). In one preferred embodiment, which is based on the method disclosed in "Fast Bilateral Filtering for the Display of High-Dynamic-Range Images," Fréda Durand and Julie Dorsey, ACM Transactions of Graphics (Proceedings of the ACM SIGGRAPH '02 Conference), the scale separation in step 902 includes applying a bilateral filter implementation to the video file to generate the level channel (the low frequency components representing the large scale features), then the level channel is subtracted from the original image to generate the detail channel (the high frequency components representing the fine details). The bilateral filter can be the temporal bilateral filter disclosed in "Seperable bilateral filtering for fast video preprocessing," Tuan Q. Pham and Lucas J. van Vliet, International Conference on Multimedia and Expo, IEEE, 2005, but can be applied to the video in the manner described by Durand and Dorsey to separate the video into the large scale features (approximation of illumination) and the fine details (approximation of reflectance). Accordingly, the temporal bilateral filter can be applied to generate the level video, then the level video is subtracted from the original video to generate the detail video. The temporal bilateral filter can be applied with a larger range sigma and spatial sigma (as described by Durand and Dorsey) than it would be in a noise reduction technique.

The level video and the detail video can be calculated as the bilateral blur of the intensity image or as the bilateral blur of each of the R, G and B independently. If the level video and detail video are calculated from the intensity image, the color from the original image is recombined with the level video and the detail video after they are filtered and recombined. If the level video and detail video are calculated from each of the R, G and B independently, the level video and detail video include the color components and it is not necessary to recombine the color from the original image with the level video and the detail video after they are filtered and recombined.

Because the video file is a linear video file, step 902 includes putting the video file through a log transform before the temporal bilateral filter is applied. In an alternative embodiment, the log transform may be replaced by a gamma correction operation, which behaves very similarly to a log transform operation.

The exemplary embodiment of scale separation involves bilateral filtering in the log domain; however, in other embodiments of the present invention, the scale separation can be performed by using any blurring filter, for example a Gaussian filter. The blurring can be performed in any domain, for example linear, log or gamma corrected. Performance will be better with any filter of the class of "edge preserving blurring filters," such as bilateral filters, median filters, anisotropic diffusion, or guided filters, as described in "Guided Image Filtering," K. He, J. Sun and X. Tang, Proceeding of European Conference Computer Vision (ECCV) (2010).

In step 908, the CPU 12 operates to separately perform, either in a parallel operation, or in a sequence, a level component filtering on the level video output in step 910 and a detail component filtering on the detail video output in step 912. In this embodiment, the level component filtering in step 910 includes spatially subsampling the level video and the detail component filtering in step 912 includes temporally subsampling the detail video. In this embodiment, similar to the subsampling described above with respect to FIG. 16, the level component filtering includes spatially subsampling the level video and the detail component filtering includes temporally subsampling the detail video. The spatial subsampling of the level video can include reducing the spatial resolution of each of the level video frames of the level video. The temporal subsampling of the detail video can include reducing the frame rate of the detail video by removing j detail video frame(s) out of every k detail video frames of the detail video in a repeating pattern. Steps 910 and 912 can also include additional or alternative filtering operations.

The spatial subsampling and the temporal subsampling reduce the sizes of the level video and the detail video, reducing the size of the video file storing the level and detail videos. In step 910, the CPU 12 can perform one or more alternative or additional filtering processes on each of the level video frames, and in step 912, the CPU 12 can perform one or more alternative or additional filtering processes on each of the detail video frames.

In a step 914, the CPU 12 operates to separately interpolate the filtered level video and the filtered detail video and then re-mix the interpolated level video and the interpolated detail video according to a pixel-by-pixel or sample-by-sample operation to form a recombined scale-separated video. In this embodiment, CPU 12 operates to perform, either in a parallel operation, or in a sequence, separate interpolation processes on the filtered level video and the filtered detail video. If the level video and detail video are in the log domain, the re-mixing involves element-wise adding all of the channels of the pixels of the level video and the detail video (log(video)=log(level)+log(detail)), then exponentiating the log space output to get back to the linear-space version of the video. In this embodiment, the recombined scale-separated video file has a reduced file size compared to the video file input at step 900.

Similar to step 514 of FIG. 16, the interpolating in step 914 can include creating interpolated level frames from the filtered level frames created in the level component subsampling in step 908 by interpolating spatially between pairs of horizontally and vertically adjacent pixels of each of the filtered level frames created in step 910 to output an interpolated level video for re-mixing. Also, similar to step 514, the interpolating in step 914 can also include creating interpolated detail frames to replace the detail frames removed in the detail component subsampling in step 912 by interpolating each pixel position of a detail frame directly preceding the corresponding removed detail frame and a detail frame directly following the corresponding removed detail frame to output an interpolated detail video for re-mixing.

In a step 916, gamma correction and/or tone adjustment can be performed on the recombined scale-separated video. In a step 918, the recombined scale-separated video is compressed or encoded for transmission or storage. An encoder (or CPU carrying out the process) proceeds to compress or encode the recombined scale-separated video according to a known compression format such as H.264/AVC, HEVC or another format.

According to a feature of the present invention, in step 920, the compressed recombined scale-separated video (video formed of filtered, interpolated and scale-separated images) is stored by the CPU 12 in the memory 16 and/or transmitted, for example, via the Internet 26, to a remote device configured, for example, as a website 28 (see FIG. 1). The remote device comprises, for example, a PC, a smartphone, a tablet computer, or a device in a TV broadcast operation.

Figure 27:
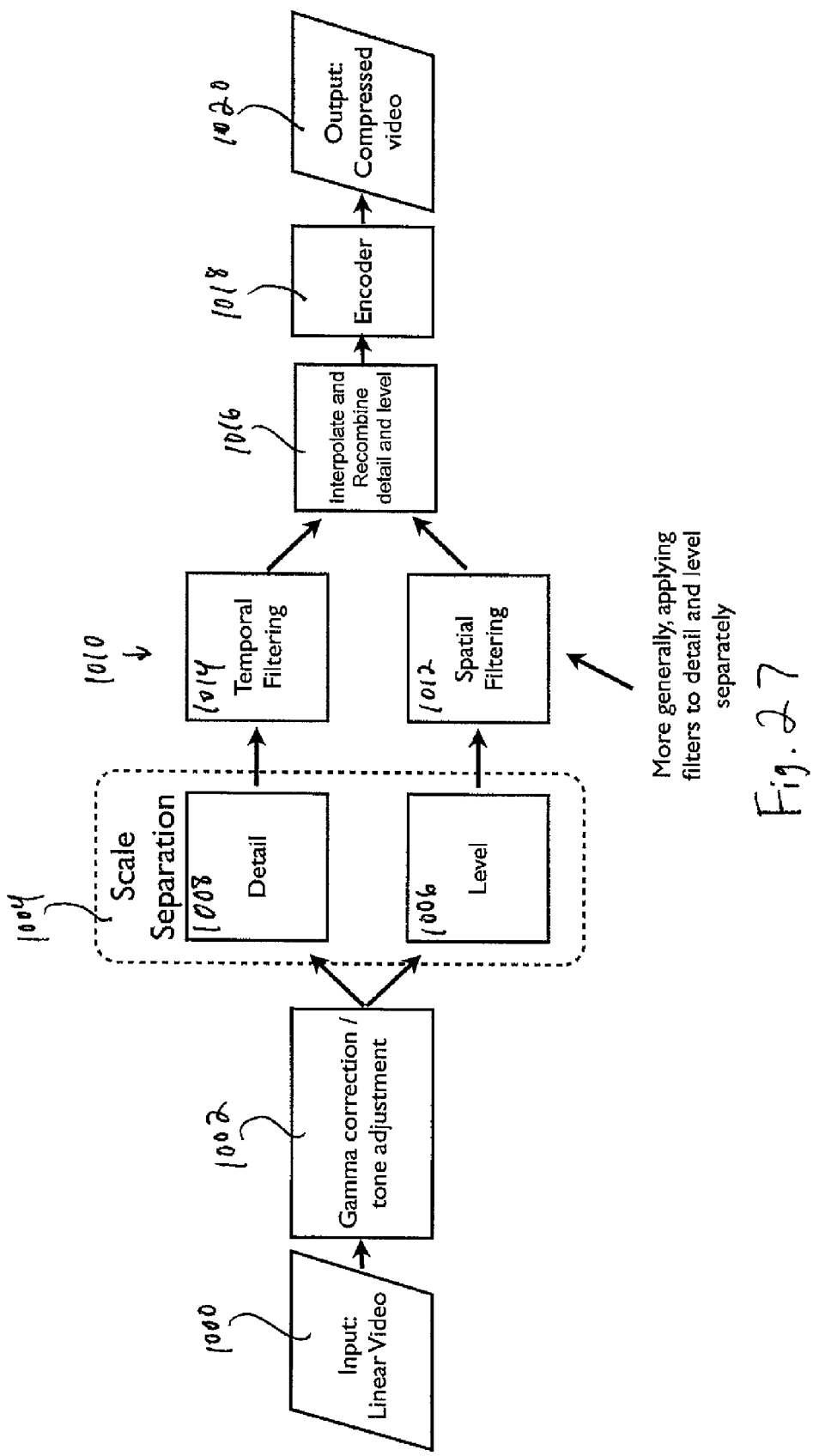

FIG. 27 shows a flow chart for processing a video, according to another embodiment of the present invention. Similar to the embodiment described in FIG. 26, the video processing method shown in FIG. 27 involves scale separating a video file.

In contrast to the method of FIG. 26, video file 18 received by CPU 12 can be a non-linear video file including non-linear, tone-adjusted data. Some video cameras can provide linear video, but most only provide non-linear, tone adjusted video. In step 1000, the camera records the linear video file and performs a gamma correction/tone adjustment on the linear video file in a step 1002 before outputting a non-linear video to CPU 12. In step 1004, similar to step 902, the CPU 12 operates to scale separate the video file to output low frequency components—the larger structures—in a level video (step 1006) and high frequency components—the details—in a detail video (step 1008). In one preferred embodiment, the scale separation in step 1004 includes applying a temporal bilateral filter implementation to the video file in the same manner as described above in step 902 to separate the video file into the detail video and the level video. In contrast to step 902, because the camera performed the gamma correction/tone adjustment in step 1002, the CPU 12 does not have to put the video through a log transform before the temporal bilateral filter is applied. A gamma corrected image or video is very similar to an image or video in the log domain. Accordingly, the scale separation technique works approximately as well on gamma corrected videos as it does on linear videos with a log transform.

In step 1010, as with step 908, the CPU 12 operates to separately perform, either in a parallel operation, or in a sequence, a level component filtering on the level video output in step 1012, which includes spatially subsampling the level video, and a detail component filtering on the detail video output in step 1014, which includes temporally subsampling the detail video. Steps 1012 and 1014 can also include additional or alternative filtering operations.

In a step 1016, as with step 914, the CPU 12 operates to separately interpolate the filtered level video and the filtered detail video and then re-mix the interpolated level video and the interpolated detail video according to a pixel-by-pixel or sample-by-sample operation to form a recombined scale-separated video. In this embodiment, CPU 12 operates to perform, either in a parallel operation, or in a sequence, separate interpolation processes on the filtered level video and the filtered detail video. The re-mixing involves element-wise adding all of the channels of the pixels of the level video and the detail video (recombined video=interpolated level video+interpolated detail video).

Similar to step 914 of FIG. 26, the interpolating in step 1016 can include creating interpolated level frames from the filtered level frames created in the level component subsampling in step 1010 by interpolating spatially between pairs of horizontally and vertically adjacent pixels of each of the filtered level frames created in step 1012 to output an interpolated level video for re-mixing. Also, similar to step 914, the interpolating in step 1016 can also include creating interpolated detail frames to replace the detail frames removed in the detail component subsampling in step 1014 by interpolating each pixel position of a detail frame directly preceding the corresponding removed detail frame and a detail frame directly following the corresponding removed detail frame to output an interpolated detail video for re-mixing.

In a step 1018, as with step 918, the recombined scale-separated video is compressed or encoded for transmission or storage. Because gamma correction/tone adjustment was applied to the video file in step 1002, gamma correction/tone adjustment does not need to be applied to the video before compression as with step 916 in FIG. 26.

According to a feature of the present invention, in step 1020, as with step 920, the compressed recombined scale-separated video (video formed of filtered, scale-separated and interpolated images) is stored by the CPU 12 in the memory 16 and/or transmitted, for example, via the Internet 26, to a remote device configured, for example, as a website 28 (see FIG. 1).

Figure 28:
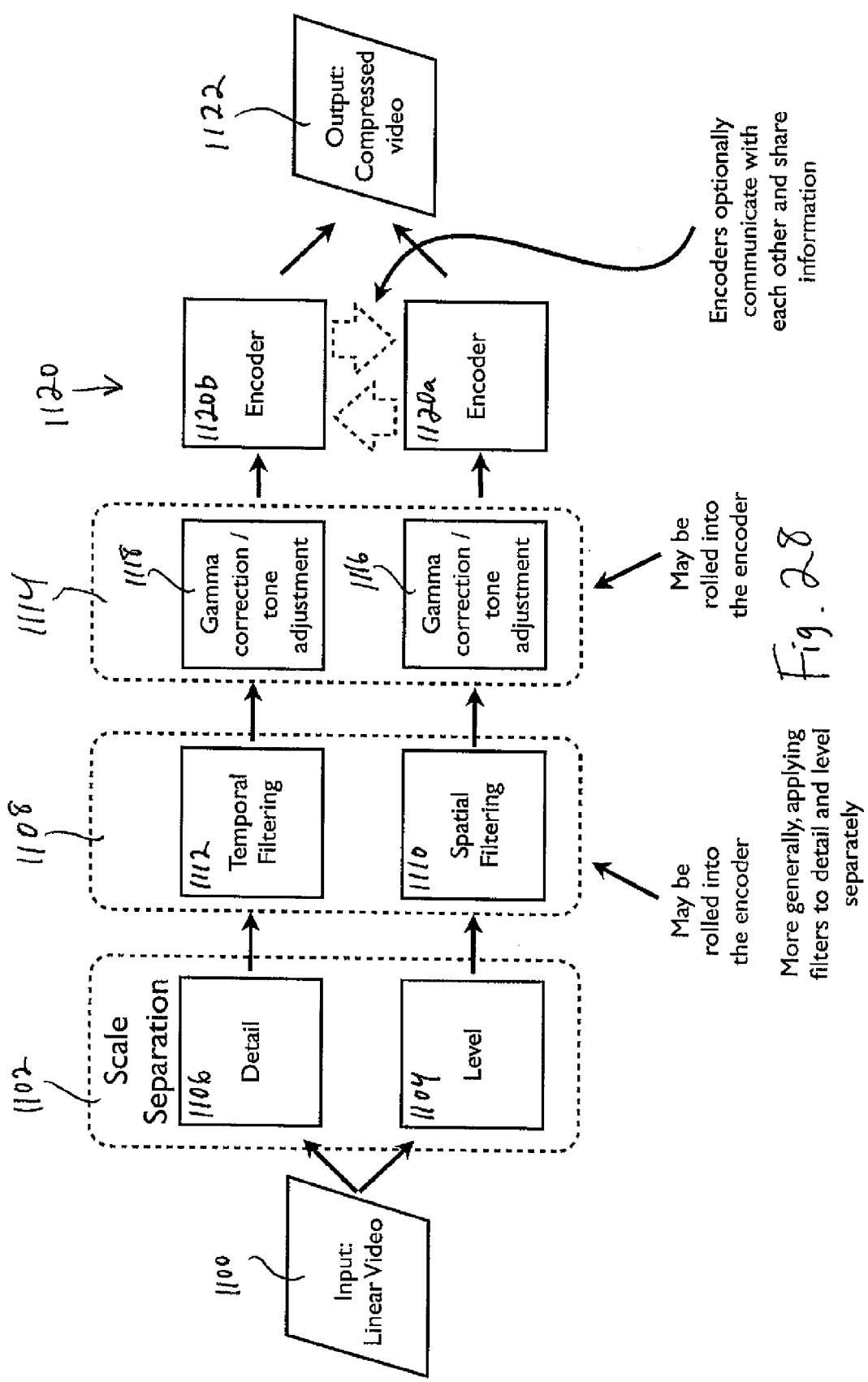

FIG. 28 shows a flow chart for processing a linear video, from video file 18, according to another embodiment of the present invention. Steps 1100, 1102, 1104, 1106 of FIG. 28 are the same as steps 900, 902, 904, 906 of FIG. 26. In step 1100, the CPU 12 receives an original video file, for example, a video file 18 from the memory 16. In step 1102, the CPU 12 operates to generate scale-separated images from the each of the video frames of the original video file to output a level video (step 1104) and a detail video (step 1106). In this embodiment, the level video is in the same range of values as the original video, while the detail video is originally centered around zero and is shifted to be centered around 128 before saving, and then shifted back when adding the level and detail videos back together.

Steps 1108, 1110, 1112 of FIG. 28 are the same as steps 908, 910, 912 of FIG. 26. In step 1108, the CPU 12 operates to separately perform, either in a parallel operation, or in a sequence, a level component filtering on the level video output in step 1110, which includes spatially subsampling the level video, and a detail component filtering on the detail video output in step 1112, which includes temporally subsampling the detail video. Steps 1110 and 1112 can also include additional or alternative filtering operations.

Starting at step 1114, the method of FIG. 28 begins to vary from the method of FIG. 26. In a step 1114, in contrast to the method of FIG. 26, in which the filtered level and details videos are first interpolated and recombined, the CPU 12 can operate to separately perform either in a parallel operation, or in a sequence, gamma correction and/or tone adjustment on the filtered level video (step 1116) and the filtered detail video (step 1118).

In a step 1120, the CPU 12 operates to separately compress or encode, either in a parallel operation, or in a sequence, filtered level video and the filtered detail video, which are performed by separate encoders 1120a, 1120b, respectively, of CPU 12. For example, the CPU 12 operates to convert the level maps and detail maps to a known sampling format such as RGB, YCrCb or YUV. The CPU 12 then proceeds to compress the converted level maps and detail maps according to a known compression format such as H.264/AVC, HEVC or another format. The individual encoders 1120a, 1120b can optionally communicate with each other while compressing the filtered level video and the filtered detail video, respectively. In one embodiment, steps 1110, 1112 and/or steps 1116, 1118 can also be performed by encoders 1120a, 1120b.

According to a feature of the present invention, in step 1122, the compressed filtered level video (video formed of filtered and compressed level images) and the compressed filtered detail video (video formed of filtered and compressed detail images), either in a parallel operation, or in a sequence, are stored by the CPU 12 in the memory 16 and/or transmitted, for example, via the Internet 26, to a remote device configured, for example, as a website 28 (see FIG. 1) in the form of two video streams, a stream of the compressed filtered level video and a stream of the compressed filtered detail video, separately or together. The compressed filtered level video and the compressed filtered detail video can then be decompressed, interpolated recombined in the same manner as the compressed filtered illumination video and the compressed filtered material video are with respect to FIG. 21.

Figure 29:
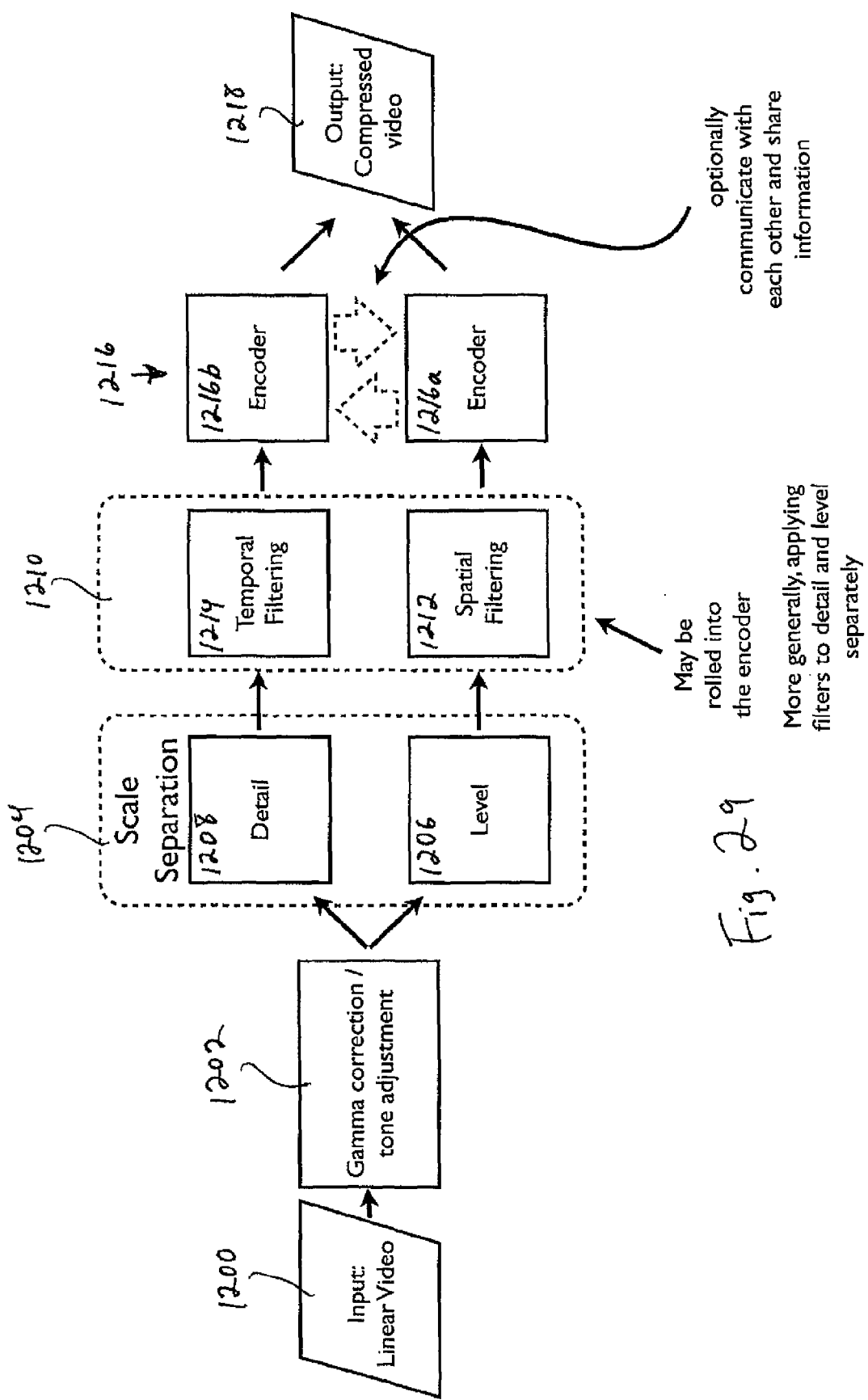

FIG. 29 shows a flow chart for processing a linear video, from video file 18, according to another embodiment of the present invention. Steps 1200, 1202, 1204, 1206, 1208 of FIG. 29 are the same as steps 1000, 1002, 1004, 1006, 1008 of FIG. 27. In step 1200, the camera records the linear video file and performs a gamma correction/tone adjustment on the linear video file in a step 1202 before outputting a non-linear video to CPU 12. In step 1204, the CPU 12 operates to generate scale-separated images from the each of the video frames of the original video file to output a level video (step 1206) and a detail video (step 1208). In this embodiment, the level video is in the same range of values as the original video, while the detail video is originally centered around zero and is shifted to be centered around 128 before saving, and then shifted back when adding the level and detail videos back together. As with step 1004, the scale separation in step 1204 includes applying a temporal bilateral filter implementation to the video file in the same manner as described above in step 902 to separate the video file into the detail video and the level video, without first putting the video through a log transform.

Steps 1210, 1212, 1214 of FIG. 28 are the same as steps 1010, 1012, 1014 of FIG. 27. In step 1210, the CPU 12 operates to separately perform, either in a parallel operation, or in a sequence, a level component filtering on the level video output in step 1212, which includes spatially subsampling the level video, and a detail component filtering on the detail video output in step 1214, which includes temporally subsampling the detail video. Steps 1212 and 1214 can also include additional or alternative filtering operations.

Starting at step 1216, the method of FIG. 29 begins to vary from the method of FIG. 27. In a step 1216, as with step 1120 of FIG. 28, the CPU 12 operates to separately compress or encode, either in a parallel operation, or in a sequence, the filtered level video and the filtered detail video, which are performed by separate encoders 1216a, 1216b, respectively, of CPU 12.

Then in step 1218, as with step 1122 of FIG. 28, the compressed filtered level video (video formed of filtered and compressed level images) and the compressed filtered detail video (video formed of filtered and compressed detail images), either in a parallel operation, or in a sequence, are stored by the CPU 12 in the memory 16 and/or transmitted, for example, via the Internet 26, to a remote device configured, for example, as a website 28 (see FIG. 1) in the form of two video streams, a stream of the compressed filtered level video and a stream of the compressed filtered detail video, separately or together. The compressed filtered level video and the compressed filtered detail video can then be decompressed, interpolated recombined in the same manner as the compressed filtered illumination video and the compressed filtered material video are with respect to FIG. 21.

In alternative embodiments of the methods described with respect to FIGS. 26 to 29, the level component filtering includes applying spatially or other type of filtering the level video frames, without subsampling and interpolating. The filtering may be performed by any appropriate filtering technique or techniques, including for example motion compensating filters, spatio-temporal filters, wavelet filters, subband filters.

Figure 30:
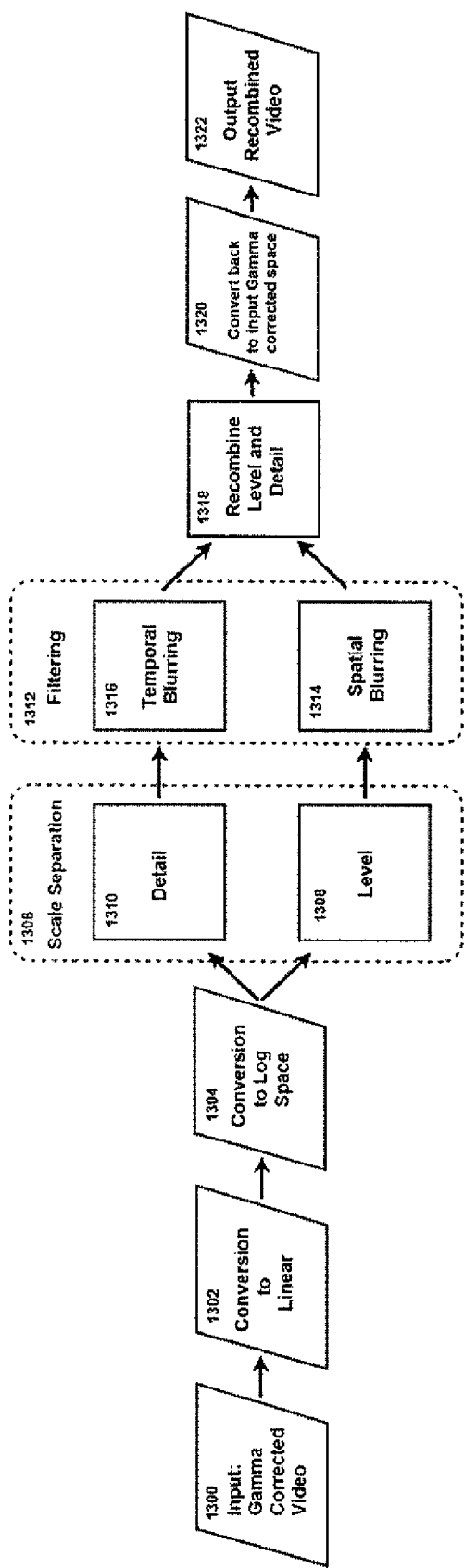
FIG. 30 shows a flow chart for processing a gamma corrected video, according to another embodiment of the present invention.

FIG. 30 shows a flow chart for processing a video, according to another embodiment of the present invention. Similar to the embodiments described in FIGS. 26 to 29, the video processing method shown in FIG. 30 involves scale separating a video file.

In step 1300, a processor, for example CPU 12, receives a gamma corrected video file. The gamma corrected video file may be, for example, in CIE Rec. 603 color space for standard definition transmission, in CIE Rec. 709 color space for HD transmission, in sRGB color space, or simple gamma correction wherein linear values from the camera sensor have undergone a simple gamma correction as such as output= input ^(1/2.2).

In a step 1302, the processor converts the gamma corrected video file into a linear video file in an approximately linear color space, by applying an inverse of gamma correction to the gamma corrected video file. The inverse may be in CIE Rec. 603, in CIE Rec. 709, in sRGB, or simple gamma depending on the coding standard of the gamma corrected video file. If the coding standard of the gamma corrected video file is not known, any of CIE Rec. 603, CIE Rec. 709, sRGB, or simple gamma may be selected. In one preferred embodiment, if the coding standard of the gamma corrected video file is not known, CIE Rec. 709 is selected for inversion. In a step 1304, the processor puts the linear video through a log transform to convert the linear video file into a log video file in a log color space.

Next, in a scale separation step 1306, the processor operates to scale separate the video file to output low frequency components—the larger structures—in a level video (step 1308) and high frequency components—the details—in a detail video (step 1310). An edge preserving blur filter is applied to the log video file in a step 1308. In this preferred embodiment, the edge preserving blur filter is a guided filter, such as the one described in "Guided Image Filtering," K. He, J. Sun and X. Tang, Proceeding of European Conference Computer Vision (ECCV) (2010), mentioned above. In step 1308, the guided filter generates a level video. In the preferred embodiment, the guided filter has a spatial sigma of 15 and a range sigma of 1.2, applied to the log video file. The level video is then used in a step 1310 to generate the detail video by subtracting the level video from the input log video file. Following steps 1308, 1310, the detail video and the level video are exponentiated to convert the detail video and the level video back into linear space for further filtering.

In step 1312, after the level video and the detail video are exponentiated, the processor operates to separately perform, either in a parallel operation, or in a sequence, a level component filtering on the level video and a detail component filtering on the detail video. In this embodiment, the level component filtering in step 1314 includes spatially blurring the level video, and the detail component filtering in step 1316 includes temporally blurring the detail video.

The temporal blurring is performed by a temporal Gaussian filter. In one preferred embodiment, the temporal Gaussian filter is a standard Gaussian filtering performing a simple weighted average of four frames, centered around frame N: (1*(frame N−2)+2*(frame N−1)+8*(frame N)+2*(frame N+1))/13.0.

In another preferred embodiment, the temporal blurring may be performed by a temporal Gaussian filter with motion compensation. Motion compensation uses estimation of the motion of real-world surfaces between frames in the video sequence. Motion estimation can be obtained by any one of several methods well-known in the art. One class of motion estimation techniques is optical flow. For a survey of optical flow techniques, see, for example, "A Database and Evaluation Methodology for Optical Flow," S. Baker, D. Scharstein, J. P. Lewis, S. Roth, M. Black, and R. Szeliski, International Journal of Computer Vision, 92(1):1-31, March 2011. A second class of motion estimation techniques uses feature correspondence to track specific scene elements between frames, such as is described in "Feature Based Methods for Structure and Motion Estimation," Philip H. S. Tarr and Andrew Zisserman, ICCV Workshop on Vision Algorithms, pages 278-294, 1999. A third class of motion estimation techniques uses frequency-domain correspondence, such as is described in "An FFT-based technique for translation, rotation, and scale-invariant image registration", B. S Reddy and B. N. Chatterji, IEEE Transactions on Image Processing 5, no. 8 (1996): 1266-1271. Finally, a fourth class of motion estimation techniques is block-based motion estimation. For a survey of block-based motion estimation techniques, see "Survey on Block Matching Motion Estimation Algorithms and Architectures with New Results," Yu-Wen Huang, Ching-Yeh Chen, Chen-Han Tsai, Chun-Fu Shen, Liang-Gee Chen, Journal of VLSI signal processing systems for signal, image and video technology, March 2006, Volume 42, Issue 3, pp 297-320. Any of these techniques can be used to find correspondences between frames as an estimation of the scene content motion between frames. Such motion estimation may be in the form of integer pixel offsets between frames or may include subpixel alignment with fractional offsets between frames. Additionally, motion estimation may be calculated as a single translation, scale, and/or rotation of the entire frame as a whole, or it may be calculated densely, allowing spatially varying motion estimation within each frame.

To perform a temporal Gaussian filter with motion compensation, motion estimation between frames is first computed, for example, by any method described in the previous paragraph, such as block-based motion estimation. Let the motion from frame n to frame m be represented as (MX(x,y,n,m), MY(x,y,n,m)) where MX(x,y,n,m) is the motion in the x direction at location (x,y) between frames n and m, and MY(x,y,n,m) is likewise the motion in the y direction at location (x,y) between frames n and m. To find the temporally blurred version of frame n at pixel location (x,y), a weighted average of the motion-compensated locations in nearby frames is computed. The motion-compensated location in frame m of the original location (x,y) in frame n is (x+MX(x,y,n,m), y+MY(x,y,n,m)). If motion estimation includes non-integer alignment (i.e. subpixel alignment), then any standard interpolation method, such as bilinear or bicubic interpolation, can be used to find the proper interpolated value between pixel locations.

In a preferred embodiment, the temporal Gaussian filter with motion compensation is computed such that the blurred value at location (x,y) in frame n is (1*frame(n−2, x+MX(x, y,n,n−2), y+MY(x,y,n,n−2))+2*frame(n−1, x+MX(x,y,n,n−1), y+MY(x,y,n,n−1))+8*frame(n, x, y)+2*frame(n+1, MX(x,y,n,n+1), MY(x,y,n,n+1)))/13.0. Here, frame(n, x, y) represents the pixel value in frame n at location (x,y). If the location (x,y) includes non-integer values (for sub-pixel alignment), then a standard interpolation technique, such as bilinear or bicubic interpolation, is used to determine sub-pixel values.

In another preferred embodiment, the temporal Gaussian filter with motion compensation is computed such that the blurred value at location (x,y) in frame n is (1*frame(n−2, x+MX(x,y,n,n−2), y+MY(x,y,n,n−2))+2*frame(n−1, x+MX(x,y,n,n−1), y+MY(x,y,n,n−1))+8*frame(n, x, y)+2*frame(n+1, x+MX(x,y,n,n+1), y+MY(x,y,n,n+1))+1*frame(n+2, x+MX(x,y,n,n+2), y+MY(x,y,n,n+2)))/14.0.

In another preferred embodiment, the temporal Gaussian filter with motion compensation is computed such that the blurred value at location (x,y) in frame n is (1*frame(n−2, x+MX(x,y,n,n−2), y+MY(x,y,n,n−2))+2*frame(n−1, x+MX(x,y,n,n−1), y+MY(x,y,n,n−1))+8*frame(n, x, y))/11.0.

In another preferred embodiment, the temporal Gaussian filter with motion compensation is computed such that the blurred value at location (x,y) in frame n is (1*frame(n−2, x+MX(x,y,n,n−2), y+MY(x,y,n,n−2))+5*frame(n−1, x+MX(x,y,n,n−1), y+MY(x,y,n,n−1))+8*frame(n, x, y)+5*frame(n+1, x+MX(x,y,n,n+1), y+MY(x,y,n,n+1))+1*frame(n+2, x+MX(x,y,n,n+2), y+MY(x,y,n,n+2)))/20.0.

In another preferred embodiment, the temporal Gaussian filter with motion compensation is computed such that the blurred value at location (x,y) in frame n is (1*frame(n−2, x+MX(x,y,n,n−2), y+MY(x,y,n,n−2))+5*frame(n−1, x+MX(x,y,n,n−1), y+MY(x,y,n,n−1))+8*frame(n, x, y))/14.0.

In another preferred embodiment, the temporal Gaussian filter with motion compensation is computed such that the blurred value at location (x,y) in frame n is (5*frame(n−2, x+MX(x,y,n,n−2), y+MY(x,y,n,n−2))+7*frame(n−1, x+MX(x,y,n,n−1), y+MY(x,y,n,n−1))+8*frame(n, x, y)+7*frame(n+1, x+MX(x,y,n,n+1), y+MY(x,y,n,n+1))+5*frame(n+2, x+MX(x,y,n,n+2), y+MY(x,y,n,n+2)))/32.0.

The spatial blurring is performed by an edge-preserving blurring filter. In this preferred embodiment, the edge-preserving blurring filter is a guided filter, such as the one described in "Guided Image Filtering," K. He, J. Sun and X. Tang, Proceeding of European Conference Computer Vision (ECCV) (2010), mentioned above.

A first example of spatial blurring involves applying a gamma correction from the definition of sRGB space to the linear-space level channel, then applying a guided filter with a spatial sigma of 3 and a range sigma of 0.025. After the guided filter is applied, an inverse sRGB gamma correction is applied to get back to linear space.

A second example of spatial blurring involves first converting the linear-space level video back to log space (or not exponentiating the level video from log space to linear space after step 1308), then applying a guided filter with a spatial sigma of 3 and a range sigma of 0.175. After the guided filter is applied, the level video is converted back to linear space by exponentiating.

A third example of spatial blurring involves first converting the linear-space level video back to log space (or not exponentiating the level video from log space to linear space after step 1308), then applying a guided filter with a spatial sigma of 3 and a range sigma of 0.125. After the guided filter is applied, the level video is converted back to linear space by exponentiating.

In a step 1318, the processor operates to re-mix the spatially blurred level video and the temporally blurred detail video. The re-mixing involves multiplying the spatially blurred level video, which is in linear space, times temporally blurred detail video, which is also in linear space. In a step 1320, the processor converts the recombined scale-separated video, which is in linear space, back into the input gamma corrected space to form an output video. In a preferred embodiment, after step 1320, the scale-separated recombined video is in the same color space as in step 1300 and the gamma correction applied in step 1320 involves the same coding standard as the inverse gamma correction applied in step 1302. In this embodiment, the output video is essentially visually indistinguishable from the video file input at step 1300. Tone adjustment can also be performed on the output video. In a step 1322, the recombined scale-separated video is output for compression. Due to the scale separation and filtering, the output video file is capable of being compressed by a greater amount with equivalent setting than the video file input at step 1300. When compression is applied by any standard compression technique such as H.264 or HEVC to both the original video input at step 1300 and the output video in step 1322, with similar compression settings, the compressed output video is smaller than the compressed original video (i.e., video that has not been scale separated, filtered and recombined).

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An automated, computerized method for processing a video, comprising the steps of:
   providing a video file depicting a video, in a computer memory;
   scale separating the video file by applying an edge-preserving blurring filter to generate a detail scale-separated video and a level scale-separated video corresponding to the video;
   temporally blurring the detail scale-separated video and spatially blurring the level scale-separated video;
   combining the filtered detailed scale-separated video and the filtered level scale-separated video to provide an output video; and
   outputting the output video for use in a data compression operation.

2. The method of claim 1 wherein the providing the video file in the computer memory comprises receiving the video file in the computer memory as a gamma corrected video file, converting gamma corrected video into a linear video file, and then converting the linear video file into a log video file before the scale separation.

3. The method of claim 1 wherein the spatial blurring includes applying an edge-preserving blurring filter to the level scale-separated video.

4. The method of claim 3 wherein the edge-preserving blurring filter applied to the level scale-separated video is a guided filter.

5. The method of claim 1 wherein the temporal blurring includes applying a temporal Gaussian blurring filter with motion compensation to the detail scale-separated video.

6. The method of claim 1 wherein the edge-preserving blurring filter is a guided filter.

7. The method of claim 1 wherein, due to the scale separating of the video file and the temporally blurring the detail scale-separated video and the spatially blurring the level scale-separated video, the output video is capable of being compressed by a greater amount with equivalent setting than the video file.

8. A computer system which comprises:
a processor; and
a memory storing a video file containing a video;
the processor arranged and configured to execute a routine to scale separate the video file by applying an edge-preserving blurring filter to generate a detail scale-separated video and a level scale-separated video corresponding to the video; temporally blur the detail scale-separated video and spatially blur the level scale-separated video; combine the filtered detailed scale-separated video and the filtered level scale-separated video to provide an output video; and output the output video for use in a data compression operation.

9. The computer system of claim 8 wherein the providing the video file in the computer memory comprises receiving the video file in the computer memory as a gamma corrected video file, converting gamma corrected video into a linear video file, and then converting the linear video file into a log video file before the scale separation.

10. The computer system of claim 8 wherein the spatial blurring includes applying an edge-preserving blurring filter to the level scale-separated video.

11. The computer system of claim 10 wherein the edge-preserving blurring filter applied to the level scale-separated video is a guided filter.

12. The computer system of claim 8 wherein the temporal blurring includes applying a temporal Gaussian blurring filter with motion compensation to the detail scale-separated video.

13. The computer system of claim 8 wherein the edge-preserving blurring filter is a guided filter.

14. A computer program product, disposed on a non-transitory computer readable media, the product including computer executable process steps operable to control a computer to: provide a video file depicting a video, in a computer memory, scale separate the video file by applying an edge-preserving blurring filter to generate a detail scale-separated video and a level scale-separated video corresponding to the video, temporally blur the detail scale-separated video and spatially blur the level scale-separated video, combine the filtered detailed scale-separated video and the filtered level scale-separated video to provide an output video, and output the output video for use in a data compression operation.

15. The computer program product of claim 14 wherein the providing the video file in the computer memory comprises receiving the video file in the computer memory as a gamma corrected video file, converting gamma corrected video into a linear video file, and then converting the linear video file into a log video file before the scale separation.

16. The computer program product of claim 14 wherein the spatial blurring includes applying an edge-preserving blurring filter to the level scale-separated video.

17. The computer program product of claim 16 wherein the edge-preserving blurring filter applied to the level scale-separated video is a guided filter.

18. The computer program product of claim 14 wherein the temporal blurring includes applying a temporal Gaussian blurring filter with motion compensation to the detail scale-separated video.

19. The computer program product of claim 14 wherein the edge-preserving blurring filter is a guided filter.

20. The computer program product of claim 14 wherein, due to the scale separating of the video file and the temporally blurring the detail scale-separated video and the spatially blurring the level scale-separated video, the output video is capable of being compressed by a greater amount with equivalent setting than the video file.

* * * * *